US012682233B2

(12) United States Patent
Topac et al.

(10) Patent No.: US 12,682,233 B2
(45) Date of Patent: Jul. 14, 2026

(54) OPTIMIZATION AND DIGITAL TWIN OF CHROMATOGRAPHY PURIFICATION PROCESS USING PHYSICS-INFORMED NEURAL NETWORKS

(71) Applicant: Accenture Global Solutions Limited, Dublin (IE)

(72) Inventors: Omer Tanay Topac, Stanford, CA (US); Mohamad Mehdi Nasr-Azadani, San Francisco, CA (US); Yan Qin, Kent (GB); Sanjoy Paul, Sugar Land, TX (US); Jurgen Albert Weichenberger, Surrey (GB)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 653 days.

(21) Appl. No.: 18/135,857

(22) Filed: Apr. 18, 2023

(65) Prior Publication Data

US 2023/0359888 A1 Nov. 9, 2023

Related U.S. Application Data

(60) Provisional application No. 63/337,680, filed on May 3, 2022.

(51) Int. Cl.
*G06N 3/08* (2023.01)
*G06N 7/01* (2023.01)

(52) U.S. Cl.
CPC .................. *G06N 3/08* (2013.01); *G06N 7/01* (2023.01)

(58) Field of Classification Search
CPC G06N 3/08; G06N 7/01; G06N 3/084; G06N 3/04
See application file for complete search history.

(56) References Cited

U.S. PATENT DOCUMENTS

2022/0381751 A1* 12/2022 Lin ........................... G06N 3/09
2022/0390633 A1* 12/2022 Laigle ..................... G06N 3/09
(Continued)

OTHER PUBLICATIONS

Subraveti SG, Li Z, Prasad V, Rajendran A. Physics-based neural networks for simulation and synthesis of cyclic adsorption processes. Industrial & Engineering Chemistry Research. Mar. 15, 2022;61(11):4095-113. (Year: 2022).*

(Continued)

*Primary Examiner* — Oluwatosin Alabi
(74) *Attorney, Agent, or Firm* — Mannava & Kang, P.C.

(57) ABSTRACT

The present disclosure relates to systems, methods, and products for optimization of a chromatography purification process using a physics-informed neural network. The method includes inputting a plurality of process parameters into the physics-informed neural network to obtain a predicted output; calculating a loss function based on a set of governing equations, as set of constraints, and the predicted output; determining whether the physics-informed neural network is convergent based on the calculated loss function; in response to the physics-informed neural network being convergent, exporting the physics-informed neural network; and in response to the physics-informed neural network not being convergent: updating a plurality of weights in the physics-informed neural network, and inputting the plurality of process parameters to the physics-informed neural network for a next convergence iteration to calculate the loss function and determine whether the physics-informed neural network is convergent.

15 Claims, 11 Drawing Sheets

(56) References Cited

U.S. PATENT DOCUMENTS

| | | | | |
|---|---|---|---|---|
| 2023/0170049 A1* | 6/2023 | Kassis | .................... | G16B 40/20 |
| | | | | 702/19 |
| 2024/0304284 A1* | 9/2024 | McCready | ............. | G16B 40/20 |
| 2025/0264445 A1* | 8/2025 | Glaser | ............. | G01N 27/44743 |

OTHER PUBLICATIONS

Nargund, Shilpa, Kathrin Guenther, and Klaus Mauch. "The move toward biopharma 4.0: Insilico biotechnology develops "smart" processes that benefit biomanufacturing through digital twins." Genetic Engineering & Biotechnology News 39.6 (2019): 53-55. (Year: 2019).*

Strube J, Schmidt-Traub H. Dynamic simulation of simulated-moving-bed chromatographic processes. Computers & chemical engineering. Aug. 20, 1998;22(9):1309-17. (Year: 1998).*

Yang L, Meng X, Karniadakis GE. B-PINNs: Bayesian physics-informed neural networks for forward and inverse PDE problems with noisy data. Journal of Computational Physics. Jan. 15, 2021;425:109913. (Year: 2021).*

Chen Y, Yang O, Sampat C, Bhalode P, Ramachandran R, Ierapetritou M. Digital twins in pharmaceutical and biopharmaceutical manufacturing: a literature review. Processes. Sep. 2, 2020;8(9):1088. (Year: 2020).*

Zubov K, McCarthy Z, Ma Y, Calisto F, Pagliarino V, Azeglio S, Bottero L, Luján E, Sulzer V, Bharambe A, Vinchhi N. Neuralpde: Automating physics-informed neural networks (pinns) with error approximations. arXiv preprint arXiv:2107.09443. Jul. 19, 2021. (Year: 2021).*

Jalali B, Zhou Y, Kadambi A, Roychowdhury V. Physics-AI symbiosis. Machine Learning: Science and Technology. Sep. 30, 2022;3(4):041001. (Year: 2022).*

Shukla K, Xu M, Trask N, Karniadakis GE. Scalable algorithms for physics-infomed neural and graph networks. Data-Centric Engineering. Jan. 2022;3:e24. (Year: 2022).*

Santana VV, Gama MS, Loureiro JM, Rodrigues AE, Ribeiro AM, Tavares FW, Barreto Jr AG, Nogueira IB. A first approach towards adsorption-oriented physics-informed neural networks: monoclonal antibody adsorption performance on an ion-exchange column as a case study. ChemEngineering. Mar. 1, 2022;6(2):21. (Year: 2022).*

Moon S, Zhung W, Yang S, Lim J, Kim WY. PIGNet: a physics-infomed deep learning model toward generalized drug-target interaction predictions. Chemical Science. 2022;13(13):3661-73. (Year: 2022).*

Zhang Y, Lin GL, Forssén P, Gulliksson M, Fornstedt T, Cheng XL. A regularization method for the reconstruction of adsorption isotherms in liquid chromatography. Inverse Problems. Aug. 15, 2016;32(10):105005. (Year: 2016).*

Szymanski NJ, Zeng Y, Huo H, Bartel CJ, Kim H, Ceder G. Toward autonomous design and synthesis of novel inorganic materials. Materials horizons. 2021;8(8):2169-98. (Year: 2021).*

Clayton A Brooks and Steven M Cramer, "Steric mass-action ion exchange: Displacement profiles and induced salt gradients," AIChE Journal, 38(12):1969-1978, 1992.

Steven M Cramer and Guhan Jayaraman, "Preparative chromatography in biotechnology," Current opinion in biotechnology, 4(2):217-225, 1993.

Germund G. Dahlquist, "A special stability problem for linear multistep methods," BIT Numerical Mathematics 1963 3:1, 3:27-43, 3 1963. ISSN 1572-9125, doi: 10.1007/BF01963532.

Peter V Danckwerts, "Continuous flow systems: distribution of residence times," Chemical engineering science, 2(1):1-13, 1953.

Oliver Hennigh, Susheela Narasimhan, Mohammad Amin Nabian, Akshay Subramaniam, Kaustubh Tangsali, Zhiwei Fang, Max Rietmann, Wonmin Byeon, and Sanjay Choudhry, Nvidia simnet™: "An AI-accelerated multi-physics simulation framework," Lecture Notes in Computer Science (including subseries Lecture Notes in Artificial Intelligence and Lecture Notes in Bioinformatics), 12746 LNCS:447-461, 2021. ISSN 16113349. doi: 10.1007/978-3-030-77977-1 36/FIGURES/11. URL https://link.springer.com/chapter/10.1007/978-3-030-77977-1_36.

Thiemo C Huuk, Tobias Hahn, Katharina Doninger, Jan Griesbach, Stefan Hepbildikler, and Jurgen Hubbuch, "Modeling of complex antibody elution behavior under high protein load densities in ion exchange chromatography using an asymmetric activity coefficient," Biotechnology journal, 12(3):1600336, 2017.

Weiqi Ji, Weilun Qiu, Zhiyu Shi, Shaowu Pan, and Sili Deng, "Stiff-pinn: Physics-informed neural network for stiff chemical kinetics," 2021.

George Em Karniadakis, Ioannis G Kevrekidis, Lu Lu, Paris Perdikaris, Sifan Wang, and Liu Yang, "Physics-informed machine learning," Nature Reviews Physics, 3(6):422-440, 2021.

Vijesh Kumar, Samuel Leweke, Eric von Lieres, and Anurag S. Rathore, "Mechanistic modeling of ion-exchange process chromatography of charge variants of monoclonal antibody products," Journal of Chromatography A, 1426:140-153, 12 2015a. ISSN 18733778. doi: 10.1016/j.chroma. 2015.11.062.

Irving Langmuir, "The constitution and fundamental properties of solids and liquids," part i. solids, Journal of the American chemical society, 38(11):2221-2295, 1916.

Samuel Leweke and Eric von Lieres, "Chromatography analysis and design toolkit (cadet)," Com-puters & Chemical Engineering, 113:274-294, 2018.

Hui F Liu, Junfen Ma, Charles Winter, and Robert Bayer, "Recovery and purification process development for monoclonal antibody production," In MAbs, vol. 2, pp. 480-499. Taylor & Francis, 2010.

Z Ma, RD Whitley, and N-HL Wang, "Pore and surface diffusion in multicomponent adsorption and liquid chromatography systems," AIChE Journal, 42(5):1244-1262, 1996.

Aaron Mehay and Tingyue Gu, "A general rate model of ion-exchange chromatography for investigating ion-exchange behavior and scale-up," J Microb Biochem Technol, 6:216-222, 2014.

Jorgen M Mollerup, "A review of the thermodynamics of protein association to ligands, protein ad-sorption, and adsorption isotherms," Chemical Engineering & Technology: Industrial Chemistry—Plant Equipment-Process Engineering-Biotechnology, 31(6):864-874, 2008.

Annette C Moser and David S Hage, "Immunoaffinity chromatography: an introduction to applications and recent developments," Bioanalysis, 2(4):769-790, 2010.

Khac Long Nguyen, Veronique Wernert, Andre Morgado Lopes, Loic Sorbier, and Renaud Denoyel, "Effect of tortuosity on diffusion of polystyrenes through chromatographic columns filled with fully porous and porous-shell particles and monoliths," Microporous and Mesoporous Materials, 293: 109776, 2020.

Maziar Raissi, Paris Perdikaris, and George E Karniadakis, "Physics-informed neural networks: A deep learning framework for solving forward and inverse problems involving nonlinear partial differential equations," Journal of Computational Physics, 378:686-707, 2019.

Anurag S Rathore, Devashish Kumar, and Nikhil Kateja, "Recent developments in chromatographic purification of biopharmaceuticals," Biotechnology letters, 40(6):895-905, 2018.

J Rouquerol, D Avnir, CW Fairbridge, DH Everett, JM Haynes, N Pernicone, JDF Ramsay, KSW Sing, and KK Unger, "Recommendations for the characterization of porous solids (technical report)," Pure and applied chemistry, 66(8):1739-1758, 1994.

Koen Sandra, Isabel Vandenheede, and Pat Sandra, "Modern chromatographic and mass spectro-metric techniques for protein biopharmaceutical characterization," Journal of chromatography A, 1335:81-103, 2014.

Karin Westerberg, Ernst Broberg Hansen, Marcus Degerman, Thomas Budde Hansen, and Bernt Nilsson, "Model-based process challenge of an industrial ion-exchange chromatography step," Chemical engineering & technology, 35(1):183-190, 2012.

Leslie S Wolfe, Cartney P Barringer, Sigma S Mostafa, and Abhinav A Shukla, "Multimodal chro-matography: characterization of protein binding and selectivity enhancement through mobile phase modulators," Journal of Chromatography A, 1340:151-156, 2014.

(56) References Cited

OTHER PUBLICATIONS

Yang Yang, Suzanne S Farid, and Nina F Thornhill, "Prediction of biopharmaceutical facility fit issues using decision tree analysis," In Computer Aided Chemical Engineering, vol. 32, pp. 61-66. Elsevier, 2013.

* cited by examiner

Multi-scale Process a) Column inlet    packed bed    outlet b) Interstitial medium dispersion    dispersion advection    advection film mass transfer c) Porous bead film mass transfer    pore diffusion sorption

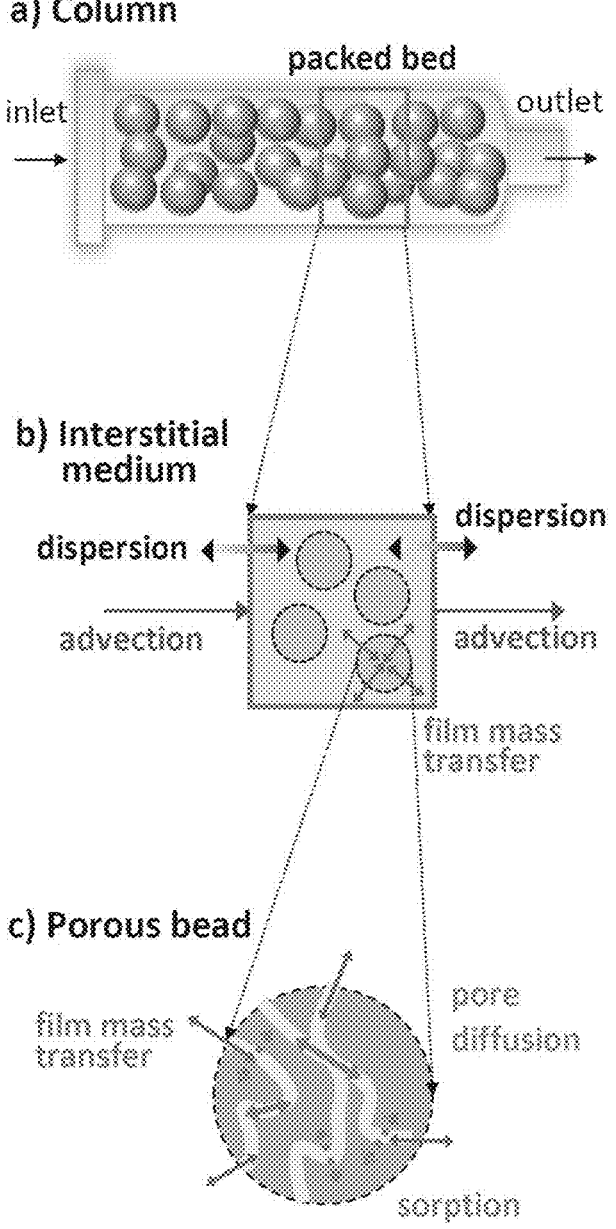

Model (PDE/ODE)

a) Interstitial mass balance $$\frac{\partial c_{p,i}}{\partial t} = \underbrace{-u\frac{\partial c_i}{\partial z}}_{\text{advection}} +$$

$$\underbrace{+D_{ax,i}\frac{\partial^2 c_i}{\partial z^2}}_{\text{dispersion}} \underbrace{-\frac{3}{\beta_c r_p}J_{f,i}}_{\substack{\text{film mass}\\\text{transfer}}}$$

b) Mass balance within bead $$\frac{\partial c_i}{\partial t} = \underbrace{-\frac{1}{\beta_p}\frac{\partial q_i}{\partial t}}_{\text{sorption}} +$$

$$\underbrace{+D_{p,i}\left(\frac{\partial^2 c_{p,i}}{\partial r^2} + \frac{2}{r}\frac{\partial c_{p,i}}{\partial r}\right)}_{\text{pore diffusion}}$$

c) Binding within bead $$\underbrace{\frac{dq_i}{dt} = k_{a,i}c_{p,i} - k_{d,i}q_i}_{\text{sorption}}$$

Figure 6

(b) Cylindrical coordinate system ($r$, $\varphi$) utilized to model physics inside a porous bead (w/ radius $r_p$)

(a) Column geometry & appropriate axial ($z$) plus cylindrical coordinate systems ($\rho$, $\theta$)

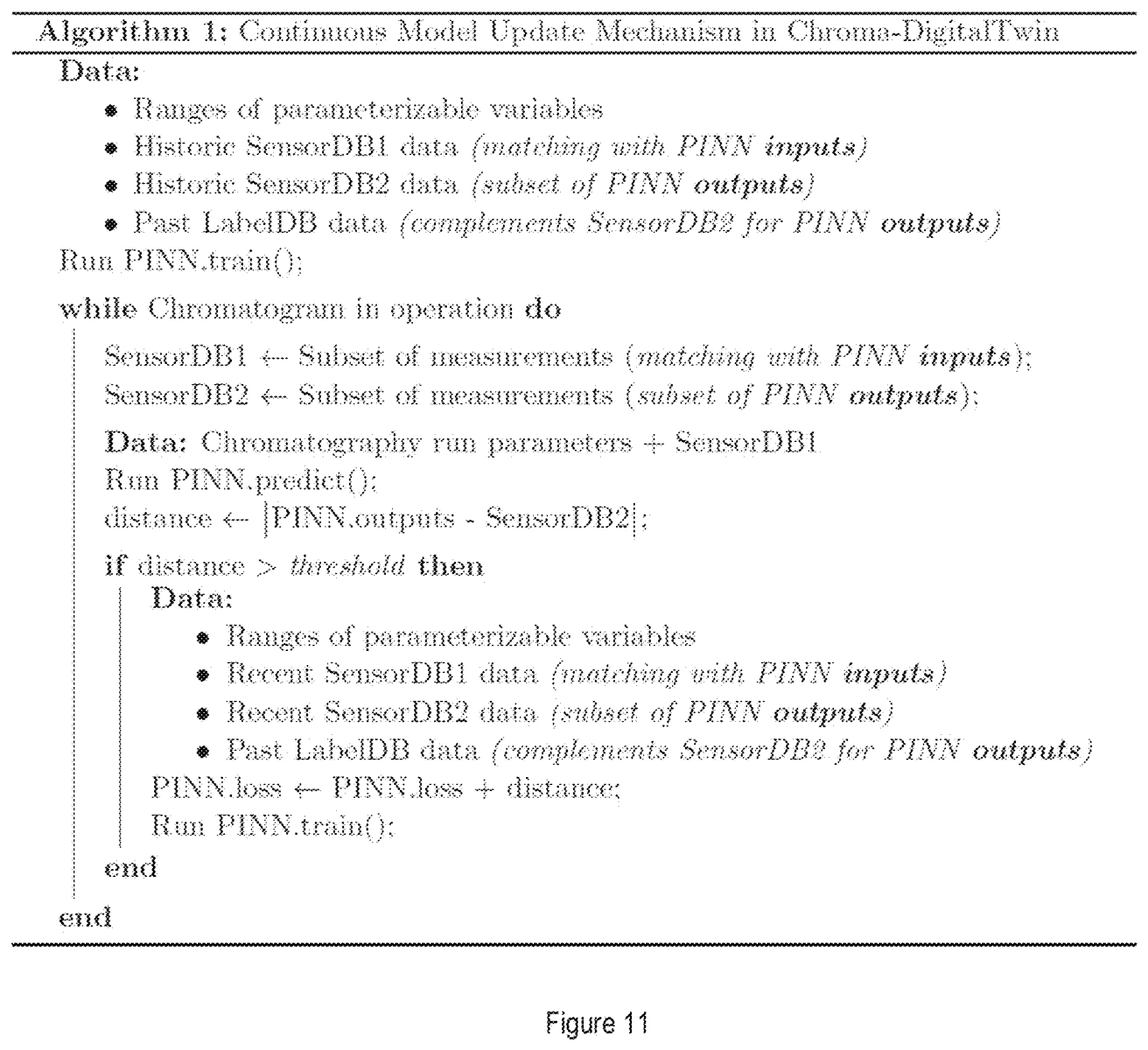

Algorithm 1: Continuous Model Update Mechanism in Chroma-DigitalTwin

Data:
- Ranges of parameterizable variables
- Historic SensorDB1 data (*matching with PINN inputs*)
- Historic SensorDB2 data (*subset of PINN outputs*)
- Past LabelDB data (*complements SensorDB2 for PINN outputs*)

Run PINN.train();

while Chromatogram in operation do

SensorDB1 ← Subset of measurements (*matching with PINN inputs*);
   SensorDB2 ← Subset of measurements (*subset of PINN outputs*);

Data: Chromatography run parameters + SensorDB1
   Run PINN.predict();
   distance ← |PINN.outputs - SensorDB2|;

if distance > *threshold* then
      Data:
      - Ranges of parameterizable variables
      - Recent SensorDB1 data (*matching with PINN inputs*)
      - Recent SensorDB2 data (*subset of PINN outputs*)
      - Past LabelDB data (*complements SensorDB2 for PINN outputs*)

PINN.loss ← PINN.loss + distance;
      Run PINN.train();
   end end

Figure 11

OPTIMIZATION AND DIGITAL TWIN OF CHROMATOGRAPHY PURIFICATION PROCESS USING PHYSICS-INFORMED NEURAL NETWORKS

RELATED APPLICATION

The present application claims the benefit of U.S. Provisional Application No. 63/337,680 filed on May 3, 2022, which is incorporated by reference in its entirety.

TECHNICAL FIELD

This disclosure relates in general to the fields of machine learning and neural network, and particularly relates to the fields of using physics-informed neural networks (PINNs) in systems for improving chromatography purification process.

BACKGROUND

Neural networks (NNs) are computing systems that emulate biological learning process relying on their artificial connected computing units inspired by neurons in animal brains. With broader data availability, enhanced computational resources, and improved algorithms, it may be possible to effectively train deep NNs (DNNs) that may approximate certain function with a certain complexity.

While DNNs may be useful in many application areas where a large amount of data is available and continuously generated, their reliance on big data may be an obstacle in some other cases. PINNs are distinct from data-driven DNNs in that partial differential equations (PDEs), or similarly ordinary differential equations (ODEs), imposed by the governing physics, together with boundary conditions (BC) and initial conditions (IC) imposed by the setup of the physical and/or chemical problem are embedded into the loss function of the PINNs.

SUMMARY

The present disclosure describes various systems, methods, and/or products for optimization of a chromatography purification process using a physics-informed neural network (PINN).

The present disclosure describes a system for optimization of a chromatography purification process using a physics-informed neural network. The system includes a non-transitory memory storing instructions; and a processor in communication with the non-transitory memory. The processor executes the instructions to cause the system to: input a plurality of process parameters into the physics-informed neural network to obtain a predicted output; calculate a loss function based on a set of governing equations, a set of constraints, and the predicted output; determine whether the physics-informed neural network is convergent based on the calculated loss function; in response to the physics-informed neural network being convergent, export the physics-informed neural network; and in response to the physics-informed neural network not being convergent: update a plurality of weights in the physics-informed neural network, and input the plurality of process parameters to the physics-informed neural network for a next convergence iteration to calculate the loss function and determine whether the physics-informed neural network is convergent.

The present disclosure also describes a method for optimization of a chromatography purification process using a physics-informed neural network. The method includes inputting, by a device, a plurality of process parameters into the physics-informed neural network to obtain a predicted output. The device includes a memory storing instructions and a processor in communication with the memory. The method further includes calculating, by the device, a loss function based on a set of governing equations, as set of constraints, and the predicted output; determining, by the device, whether the physics-informed neural network is convergent based on the calculated loss function; in response to the physics-informed neural network being convergent, exporting, by the device, the physics-informed neural network; and in response to the physics-informed neural network not being convergent: updating, by the device a plurality of weights in the physics-informed neural network, and inputting, by the device, the plurality of process parameters to the physics-informed neural network for a next convergence iteration to calculate the loss function and determine whether the physics-informed neural network is convergent.

The present disclosure further describes a product. The product includes machine-readable media other than a transitory signal; and instructions stored on the machine-readable media, wherein when a processor executes the instructions, the processor is configured to: input a plurality of process parameters into a physics-informed neural network to obtain a predicted output; calculate a loss function based on a set of governing equations, a set of constraints, and the predicted output; determine whether the physics-informed neural network is convergent based on the calculated loss function; in response to the physics-informed neural network being convergent, export the physics-informed neural network; and in response to the physics-informed neural network not being convergent: update a plurality of weights in the physics-informed neural network, and input the plurality of process parameters to the physics-informed neural network for a next convergence iteration to calculate the loss function and determine whether the physics-informed neural network is convergent.

In another aspect, an embodiment of the present disclosure provides non-transitory computer-readable mediums storing instructions which when executed by a computer cause the computer to perform any of the above methods.

The above and other aspects and their implementations are described in greater detail in the drawings, the descriptions, and the claims.

BRIEF DESCRIPTION OF THE DRAWINGS

FIG. 6 shows schematics of underlying processes and associated equations in an exemplary embodiment in the present disclosure.

FIG. 11 shows a schematic diagram of an exemplary algorithm for a digital twin system in the present disclosure.

DETAILED DESCRIPTION

Figure 1:
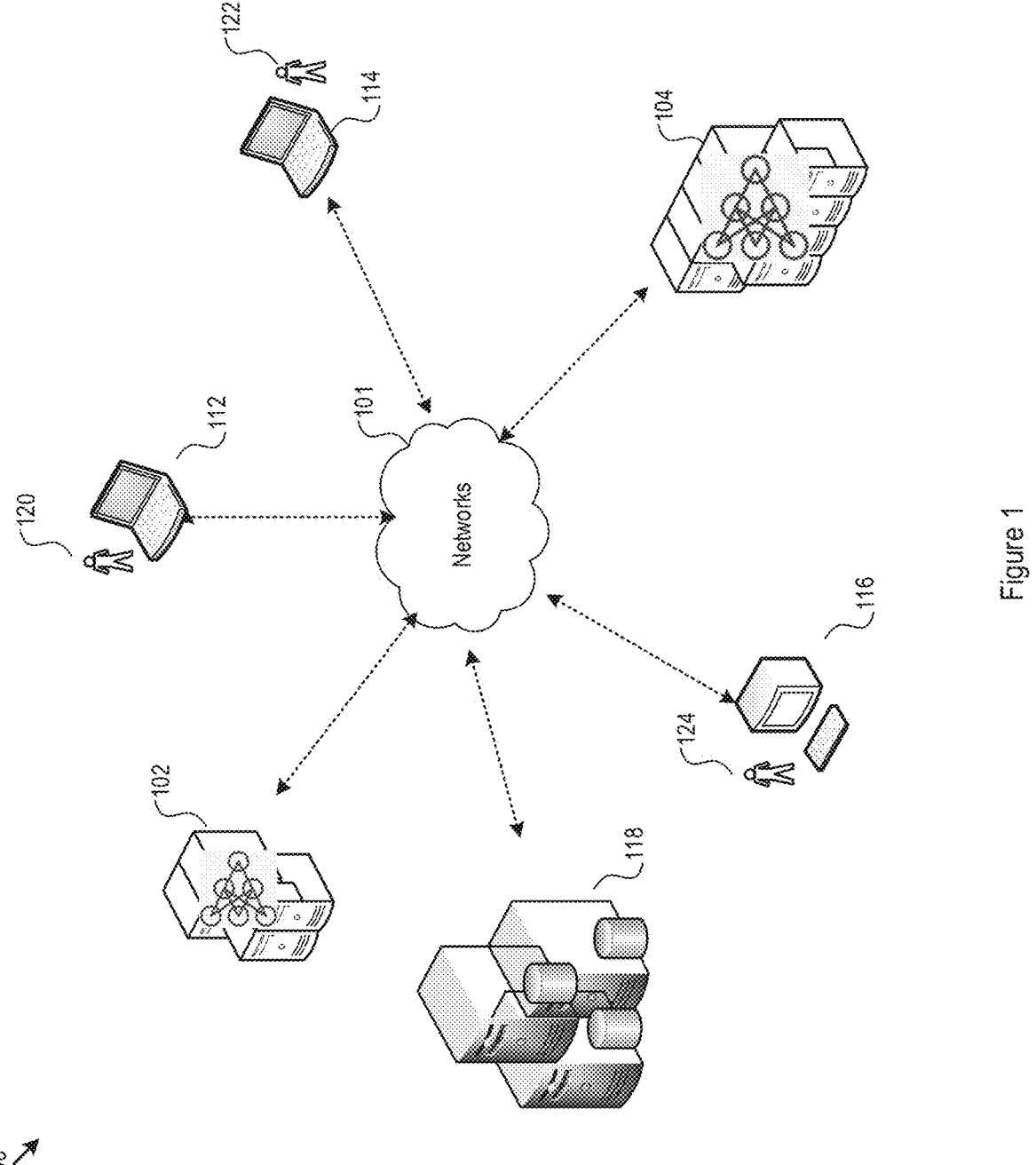
FIG. 1 shows an exemplary electronic communication environment for implementing a system including a physics-informed neural network (PINN).

The disclosure will now be described in detail hereinafter with reference to the accompanied drawings, which form a part of the present disclosure, and which show, by way of illustration, specific examples of embodiments. Please note that the disclosure may, however, be embodied in a variety of different forms and, therefore, the covered or claimed subject matter is intended to be construed as not being limited to any of the embodiments to be set forth below. Please also note that the disclosure may be embodied as methods, devices, components, or systems. Accordingly, embodiments of the disclosure may, for example, take the form of hardware, software, firmware or any combination thereof.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes various embodiments for using physics-informed neural networks (PINNs) in systems for improving chromatography purification process, wherein the systems have a framework for preparation chromatography of target protein purification. This framework allows simulating thousands of parameter combinations within seconds to enable efficient parameter optimization. The framework includes a high-fidelity digital twin component for real-time interpretation of process state. Modeling the physical processes that take place in chromatography via PINNs enables high fidelity simulations at near real-time computation speeds. The PINNs may take historic data and operation, process control, and design parameters of the chromatography purification process as its inputs and outputs the predicted resulting protein concentrations. By training the PINN for an attainable range of parameters, the systems may produce physically feasible estimates for "what-if" scenarios within the pre-defined range of input parameters. Upon training, the PINN may become a high-fidelity and lightweight simulation engine for generating data for process parameter optimization and the digital twin system (Chroma-DigitalTwin). In Chroma-DigitalTwin, the trained PINN model is continuously queried by the chromatogram sensor readings and predicts the real-time process metrics. The coupled modeling and digital twin systems may bring greater consistency and improved process control to the chromatography purification process.

Since their inception in 1950s, neural networks (NNs) have long been regarded as computing systems to emulate biological learning process due to their artificial connected units inspired by the neurons in animal brains. However, their expressive power hasn't reached the anticipated levels until early 2010s. With broader data availability, enhanced computational resources, and improved algorithms, it became possible to effectively train deep NNs (DNNs) that could approximate virtually any function, regardless of its complexity. This has been a paradigm shift for NNs and since then thousands of use cases have arisen across a wide variety of industry sectors.

While DNNs have penetrated into and became useful in many application areas where a large amount data is available and continuously generated, their reliance on big data (e.g., for training purposes) has been an obstacle in some other cases. One of these areas has been the multi-cycle development of engineering products. As described in the previous paragraphs, this process involves multiple levels of detailed physics simulations. Researchers' attempts of using data-driven DNN techniques in lieu of these simulations to generalize solution fields have largely been unsatisfactory. Two main reasons behind these results have been (i) limited quantity of data to train the DNN (due to the large cost of generating simulation data) and (ii) limited generalization capability achieved by DNN models given the inherent high-dimensionality of such problems.

PINNs may be proposed as a technique to solve complex physics or chemistry problems effectively using DNNs. PINNs are fundamentally distinct from data-driven DNNs in the way that the PDEs (or similarly ODEs) imposed by the governing physics together with the boundary conditions (BCs) and/or initial conditions (ICs) imposed by the setup of the physics or chemistry problem are embedded into the loss function of the NN. This setup, by formulation, guides prediction of the PINN model toward a physically feasible solution. In other words, a PINN model finds solution to a physics or chemistry problem by learning to represent the underlying physical phenomena—which is generalizable—instead of extrapolating based on its training dataset. By leveraging the quick inference capability that is inherent to all NNs, PINNs can infer solution for a different geometry within the initial parameterized input space in near real-time, without sacrificing any solution fidelity.

There are some issues/problems in the development and scaling up chromatography purification in industrial/manufacturing applications, as it is a complex task. A few factors may be listed as the need for large space, limited material availability, and constricted timelines. In addition, inherent variability in feed streams, for example, attributes of blood plasma samples originating from different countries/cities may dramatically vary, high purity constraints typically mandated by regulatory entities, and storage/maintenance issues pose additional challenges.

The present disclosure describes varies embodiments of methods, apparatus, devices, systems, and/or products for optimizing and/or improving chromatography purification process by a physics-informed neural network (PINN). The present disclosure may address at least one of the problems/issues discussed above, resulting in speeding up and improving accuracy in complicated design and optimization workflows. Some embodiments in the present disclosure improves computer functionality and technology, for example but not limited to, increasing simulation and/or processing speed by 10~1000 times, simplifying complex design and optimization by allowing humans to submit queries (e.g., a set of process parameters) and obtain answers fast, and/or reducing computational time, power, and/or storage requirement, for example during the course of simulating multiple (e.g., about 100) design candidates and alternatives. Some embodiments of the present disclosure may make it possible to use PINNs in complex design and optimization scenarios, for example, optimization of a chromatography purification process using a physics-informed neural network.

FIG. 1 shows an exemplary electronic communication environment 100 in which a system including physics-informed neural networks (PINNs) for improving chromatography purification process may be implemented. The electronic communication environment 100 may include a portion or all of the following: one or more servers 102 and 104, one or more user devices 112, 114, and 116 associated with users 120, 122, and 124, and one or more databases 118, in communication with each other via public or private communication networks 101.

The user devices 112, 114, and 116 may be any form of mobile or fixed electronic devices including but not limited to desktop personal computer, laptop computers, tablets, mobile phones, personal digital assistants, and the like.

The one or more database 118 of FIG. 1 may be hosted in a central database server, a plurality of distributed database servers, or in cloud-based database hosts. The database 118 may be organized and implemented in any form, including but not limited to the physics-governing equations, loss functions, training sample data, parameters of neural networks, and/or the like. The database 118 may be configured to store input data, intermediate data, and/or final results for output.

Figure 2:
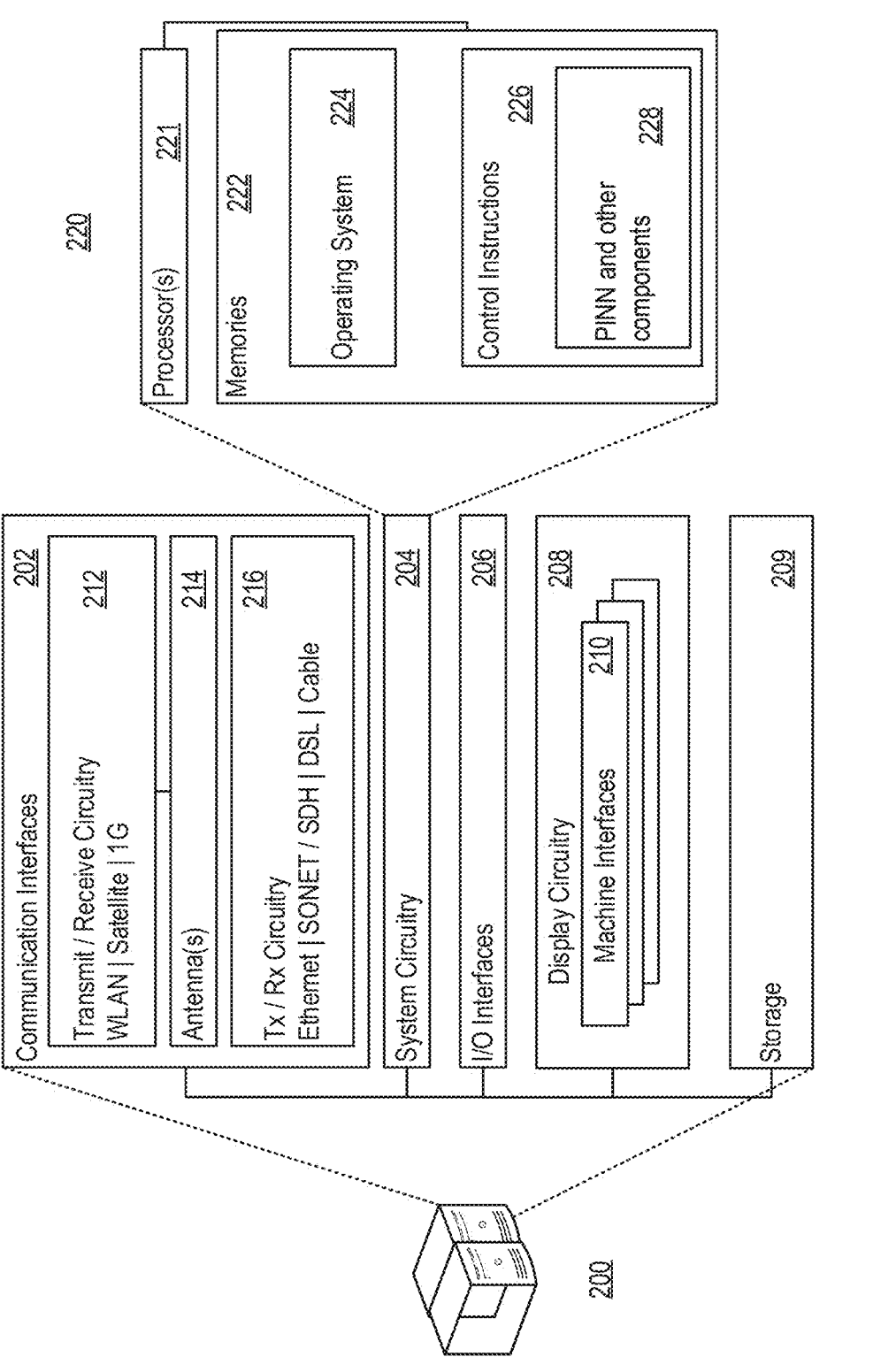
FIG. 2 shows computer systems that may be used to implement various components of the electronic communication environment of FIG. 1.

FIG. 2 shows an exemplary computer system (or "electronic device", or simply "device") 200 for implementing the one or more servers 102 and 104, or the user devices 112, 114, and 116. The computer system 200 may include communication interfaces 202, system circuitry 204, input/output (I/O) interfaces 206, storage 209, and display circuitry 208 that generates machine interfaces 210 locally or for remote display, e.g., in a web browser running on a local or remote machine. The machine interfaces 210 and the I/O interfaces 206 may include GUIs, touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmitting and receiving circuitry of the transceivers 212. The transceivers 212 and antennas 214 may support Wi-Fi network communications, for instance, under any version of IEEE 802.11, e.g., 802.11n or 802.11ac. The communication interfaces 202 may also include wireline transceivers 216. The wireline transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage 209 may be used to store various initial, intermediate, or final data or model for implementing the system including PINNs for improving chromatography purification process. These data corpus may alternatively be stored in the database 118 of FIG. 1. In one implementation, the storage 209 of the computer system 200 may be integral with the database 118 of FIG. 1. The storage 209 may be centralized or distributed, and may be local or remote to the computer system 200. For example, the storage 209 may be hosted remotely by a cloud computing service provider.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other types of circuitry.

For example, the system circuitry 204 may be implemented as 220 for the system including PINNs for improving chromatography purification process. The system circuitry 220 may include one or more processors 221 and memories 222. The memories 222 stores, for example, control instructions 226 and an operating system 224. The control instructions 226, for example may include instructions for implementing the components 228 of the system including PINNs. In one implementation, the instruction processors 221 execute the control instructions 226 and the operating system 224 to carry out any desired functionality supported by the system including PINNs for improving chromatography purification process. The memory 222 may be non-transitory memory, which may include computer-readable media (CRM) that stores data for short periods or in the presence of power, for example but not limited to, a random access memory (RAM) device.

Various embodiment described in the present disclosure may be widely applicable to many industrial applications in various fields, including but not limited to, aircraft wing design, high speed train design, small molecular design, protein folding and protein design, flight control, chemical engineering, automotive control, medical diagnosis and/or treatment, and oil/gas exploration. The present disclosure describes various embodiments for improving chromatography purification process as non-limiting examples.

Figure 3:
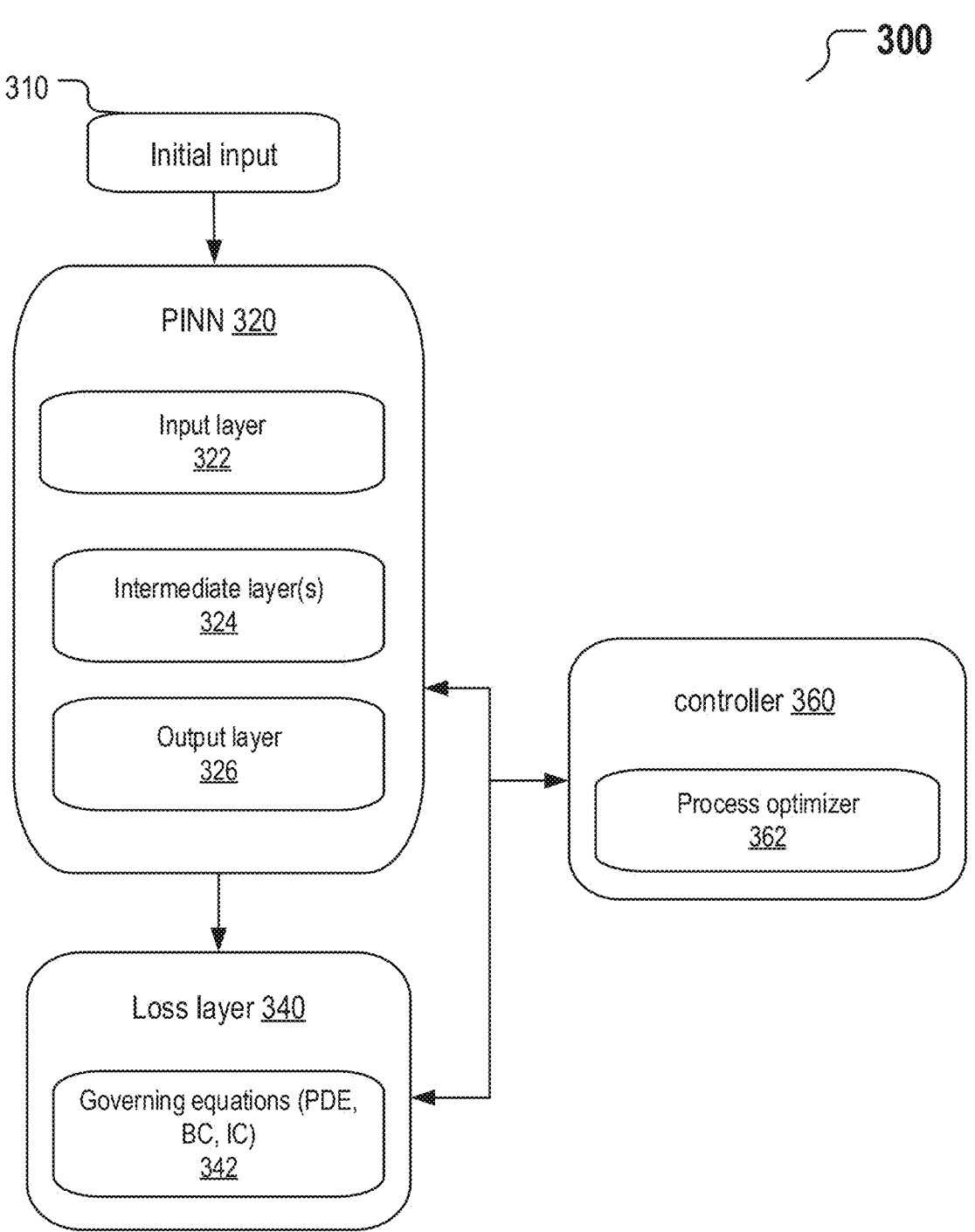
FIG. 3 shows an exemplary system architecture diagram of physics-informed neural network platform (PINN platform).

Referring to FIG. 3, the present disclosure describes a system 300 for training a physics-informed neural network (PINN) for improving chromatography purification process (Chroma-PINN). The system 300 may include a portion or all of the following: a to-be trained NN (or referred as PINN) (in training) 320, a controller 360 (or referred as training controller during training phase), and/or a loss layer 340. The PINN 320 may include an input layer 322, one or more intermediate layers 324, and an output layer 326. In some implementation, the loss layer and the training controller may be regarded as a part of the PINN. In some implementations, the system may employ a hybrid physics and data driven architecture. More detailed description about PINN and training is included in U.S. application Ser. No. 17/887, 995, filed on Aug. 15, 2022 by the same Applicant as the present application, which is incorporated herein by reference in its entirety.

The system may receive an initial input 310, which may include a plurality of process parameters. The plurality of process parameters may include a set of chromatography column process variables, and/or historic data from chromatogram sensors. In some implementations, the plurality of process parameters comprises at least one of the following: one or more operation parameters, one or more process control parameters, and one or more design parameters, or sensory data from one or more sensor in the chromatography purification process.

The input layer of PINNs may include terms that can be parameterized. During training time, PINN learns to find solutions for input value within the parameterization range, and at test time (or inference time), inference of a single set of input conditions is very quick and accurate. In Chroma-PINN, the input layer is designed to incorporate a wide range of operation, process control, and/or design variables of chromatography purification in a parameterized form as well as data from sensors in the chromatogram. Once the variables to be parameterized are determined and their ranges are set, the input layer definition of PINN is complete and the hidden layers may be chosen amongst various options that are demonstrated to be suitable for PINN.

The output layer of PINNs is similarly application-specific. Namely, it generally consists of the simulation outcome(s) of interest that can be computed via the governing equations of the system and the process outcomes that can be measured in training and test-time. In the case of chromatography, protein concentrations are one of the sought-after results of the process. Thus, a vectorized form of concentrations is the common constituents of the output layer for Chroma-PINN.

The loss layer 340 may include a set of governing equations 342, including at least one partial differential equation (PDE) and/or ordinary differential equation (ODE), at least one boundary condition (BC), and/or at least one initial condition (IC). The loss layer computers the loss function based on a superposition of the BCs/ICs, PDEs/ODEs that describe the system, and/or the difference between measured and predicted output metrics. In some implementations, In addition to physical terms, a data-driven mean squared error (MSE) term that quantifies the difference between measured metrics and predicted metrics may be used as a term to calculate the loss function, so as to incorporate the awareness from actual process.

When a loss score calculated based on the loss function is smaller than a threshold, the controller may regard the PINN being convergent and export the PINN as a trained PINN. In some implementation, the controller may determine whether the PINN is convergent based on the calculated loss function according to other criteria. For a non-limiting example, when a difference of the calculated loss function between the present iteration and the previous iteration is smaller than another threshold, the controller regards the PINN being convergent and exports the trained PINN.

When the controller regards the PINN not being convergent, the plurality of weights in the PINN are updated via backpropagation, and the PINN is trained for a next iteration, until the PINN being convergent.

In some implementations, the controller may include a process optimizer 362 for providing an effective optimization of finding a set of chromatography process parameters to achieve a desired process output. In some implementations, a desired process output may be to maximize the process output, for example, a protein concentration; and in other implementations, a desired process output may be to minimize a process output, for example, a material consumption rate. In some implementations, the process optimizer may be a unit outside the controller.

The process optimizer may include a reference architecture to a Bayesian optimizer informed by the samples supplied by a trained Chromatography PINN model. The trained Chroma-PINN may act as an on-demand data generator for the optimizer by supplying full-fidelity simulation outcomes at very high rates. With this approach an optimum set of operation, process control, and design parameters may be predicted to minimize/maximize a single or multiple process outcome(s) of interest, such as maximizing the concentration of IgG at the end. In addition to the predefined feasible ranges for variables, optimization search space may be constrained also by user-defined limits on various parameters. Optimization is an iterative process and at each iteration the optimizer determines a course of action toward the objective based on analyzing the impact of changing variables on the process outcomes.

Figure 4:
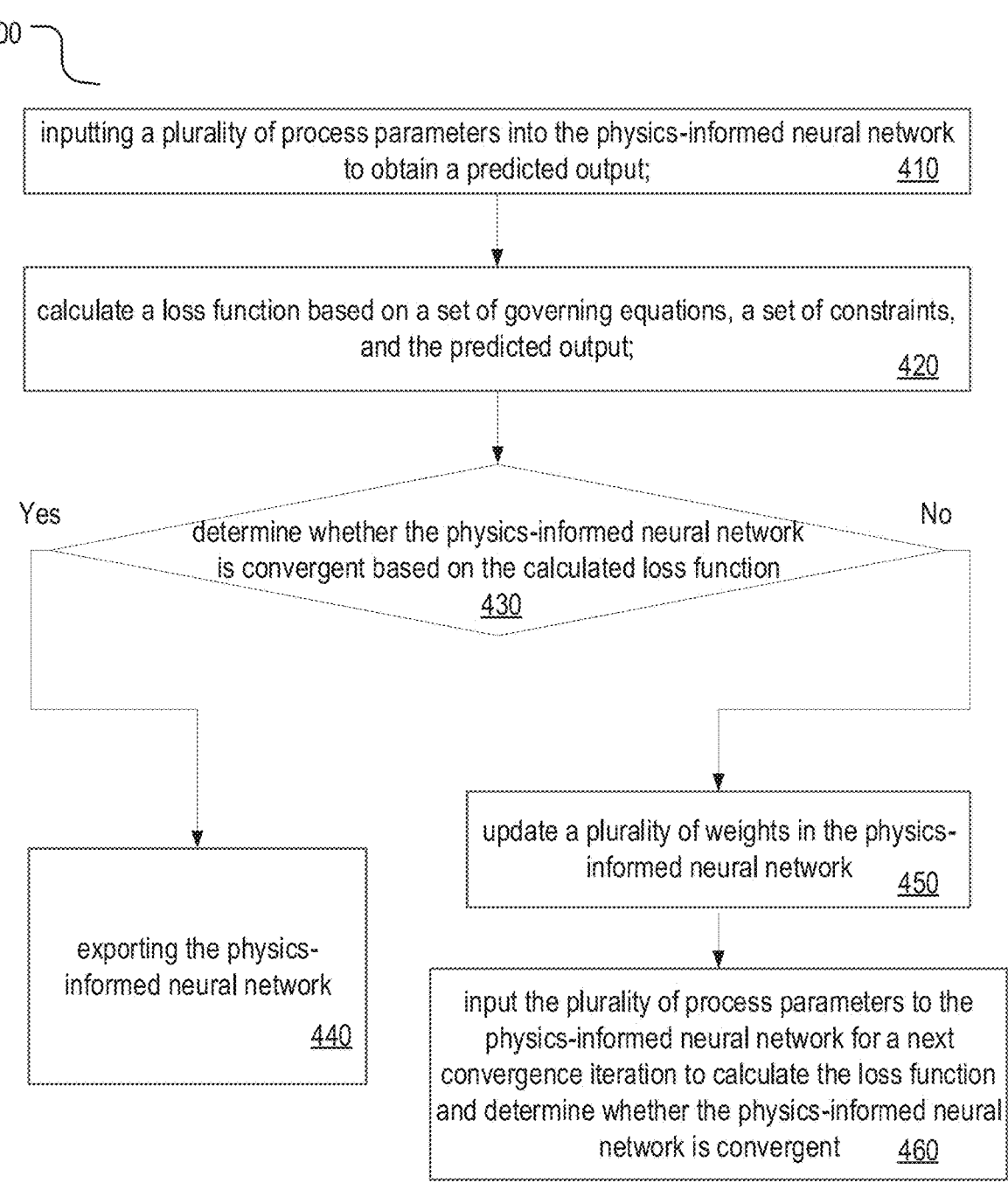
FIG. 4 shows a flow diagram of an exemplary PINN platform.

Referring to FIG. 4, the present disclosure also describes a method 400 for improving chromatography purification process with PINNs. The method 400 may include a portion or all of the following steps: step 410, inputting a plurality of process parameters into the physics-informed neural network to obtain a predicted output; step 420, calculating a loss function based on a set of governing equations, a set of constraints, and the predicted output; step 430, determining whether the physics-informed neural network is convergent based on the calculated loss function; step 440, in response to the physics-informed neural network being convergent, export the physics-informed neural network; step 450, in response to the physics-informed neural network not being convergent: updating a plurality of weights in the physics-informed neural network, and step 460, inputting the plurality of process parameters to the physics-informed neural network for a next convergence iteration to calculate the loss function and determine whether the physics-informed neural network is convergent. In some implementations, a portion or all of the steps in the method 400 may be regarded as training steps, and the convergence iteration may be referred as a training iteration.

In some implementations, the plurality of process parameters comprises at least one of the following: one or more operation parameters, one or more process control parameters, one or more design parameters, or sensory data.

In some implementations, the set of governing equations comprises at least one of the following: one or more interstitial mass balance partial differential equation (PDE), one or more bead mass balance PDE, or one or more sorption PDE.

In some implementations, the set of governing equations comprises the one or more sorption PDE, which comprises a quasi-stead-state approximation.

In some implementations, the step of calculating the loss function based on the set of governing equations and the predicted output may include inputting the plurality of process parameters into the set of governing equations to obtain a result based on a set of boundary conditions and/or a set of initial conditions; and/or calculate the loss function based on the predicted output and the result.

In some implementations, after the physics-informed neural network is exported, the method may further include inputting the predicted output into a Bayesian optimizer for optimizing the plurality of process parameters based on a pre-defined criterion; generating a new plurality of process parameters by the Bayesian optimizer based on the pre-defined criterion; inputting the new plurality of process parameters into the physics-informed neural network to obtain a new predicted output; and/or inputting the predicted output into a Bayesian optimizer for a next optimizer iteration. The optimizer iteration may continue for a number of time until the plurality of process parameters are optimized based on a pre-defined criterion.

In some implementations, the Bayesian optimizer comprises a constraint-aware Bayesian optimizer.

In some implementations, the pre-defined criterion comprises at least one of the following: maximizing a protein concentration, or minimize a quantity of material consumption.

In some embodiments, a pre-trained PINN may be included in a digital twin system called Chroma-DigitalTwin. This system complements and expands the Chroma-PINN platform by enabling the prediction and reporting of real-world chromatography process metrics at any instant during the process by continuously running Chroma-PINN in inference mode and enabling continuous re-training of the Chroma-PINN model by leveraging real-time data collection and hybrid architecture of the PINN model. Having an integral PINN model in a digital twin brings benefits to process monitoring and control as well as to model update for the chromatography process.

In some implementations, the plurality of process parameters comprise one or more sensory data during the chromatography purification process; and the physics-informed neural network is comprised in a digital twin model for providing process metrics and dynamic process control to the chromatography purification process.

In some implementations, the system may obtain a reading by a sensor based on an output of the chromatography purification process; and in response to a difference between the reading from the chromatography purification process and a corresponding prediction from the physics-informed neural network exceeding a pre-defined threshold: update the loss function based on the difference, and train the physics-informed neural network based on the updated loss function. In some implementations, steps of training the physics-informed neural network based on the updated loss function may be similar to a portion or all of the steps 410-460 in the method 400: similarly, it is determined whether the physics-informed neural network is convergent, and when the answer is yes, the training is stopped; when the answer is no, a plurality of weights in the physics-informed neural network are updated and next training iteration is performed until the physics-informed neural network is convergent.

In some implementations, the system may output dynamic process control information from the digital twin model based on the one or more process metrics; and change a process control parameter on the chromatography purification process based on the output dynamic process control information.

The present disclosure provides more non-limiting examples and descriptions of various exemplary embodiments/implementations in below sections.

As advances in protein, peptide, and vaccine engineering continue, more sophisticated biological products with improved therapeutics and diagnostics capabilities are produced at a faster pace. To bring these promising biologics to the market, bio-manufacturing companies have been pursuing continuous downstream process development in order to increase production efficiency and flexibility, reduce the energy footprint and cost of final products, and/or improve the quality of the end products along with their consistency.

Many biopharmaceutical companies utilize chromatography in their 'downstream purification processes' to extract various products, such as monoclonal antibodies from cell culture, immunoglobulins from human plasma pharmaceuticals (oligonucleotides), food (food proteins), and specialty chemicals. On the other hand, many are faced with numerous multi-faceted challenges impacting the development, application, and optimization of the chromatography purification processes. For non-limiting examples, how to assess the early-stage chromatography process feasibility with limited time, data, and budget; how to set up a satisfactory separation process of closely related impurities that are the results of the increased complexity of producing these biologics; how to speed up and scale up the manufacturing while staying consistent with the successful laboratory trials of chromatography purification; and how to reliably and predictably produce products that can meet strict regulatory mandates on purity as well as critical quality attributes that are required for effective and safe use in human trials and/or therapies. The above list of challenges/problems/issues only enumerates only a few of many common ones. In addition, a silo of industry-centric problems can emerge when large-scale manufacturers want to scale chromatography in high volume industrial applications.

Therefore, there is an immediate need for building 'end-to-end solutions' that not only can simulate the underlying complex processes involved, but also integrate/infuse process data along with human "what if" queries to produce optimal configuration and/or operation settings. This requires smart approaches during research and development (R&D), technology transfer, and manufacturing.

A digital twin (DT) is described in the present disclosure, which uses proper computational models representing the system as a whole. In some embodiments/implementations in the present disclosure, "models" may be referred to a complete set of governing equations that can accurately describe the underlying physical and/or chemical processes, fluid motion and transport of different species across a given medium with complex geometry, e.g. a porous column. In essence, a DT aimed to capture the mechanics of the chromatography system and the interactions between process parameters, key performance indicators (KPI), product yield, and product qualities, respectively. Furthermore, digital twins allow for real-time online data analytics, efficient process monitoring, and process control. All metrics of interest, and process outputs including, but not limited to target protein concentration, purity, variability, and heterogeneity can be monitored and predicted by the DT system as described in the present disclosure.

The present disclosure describes various embodiments providing a multi-fold framework for chromatography purification process. The modeling component (e.g., Chroma-PINN) may predict the outcomes of the process with higher fidelity and/or at faster speeds than existing mechanistic modeling techniques. The digital twin component (e.g., Chroma-DigitalTwin) enables real-time querying of process metrics and continuous model update through comparison of predicted and measured process monitor readings.

As a physics-informed neural network to quantitatively predict the protein behavior in a chromatography process, Chroma-PINN produces predictions based on governing equations used to model chromatography and historic data, so they are hybrid 'physics- and data-informed'. Moreover, Chroma-PINN is based on a neural network (NN), therefore prediction on a new set of input variables is very lightweight and much faster than traditional numerical solvers.

As a digital twin system to represent the real-time process metrics/variables related to chromatography, during operation, Chroma-DigitalTwin continuously monitors process data from the sensors in a chromatogram and produces advanced process performance metrics by augmenting them through Chroma-PINN model. As a result, a high-fidelity digital twin of the chromatography process is generated for monitoring and control of the end-to-end process. Owing to the model-in-the-loop architecture, the Chroma-PINN model is continuously updated to reflect the real-world system as closely as possible.

Figure 5:
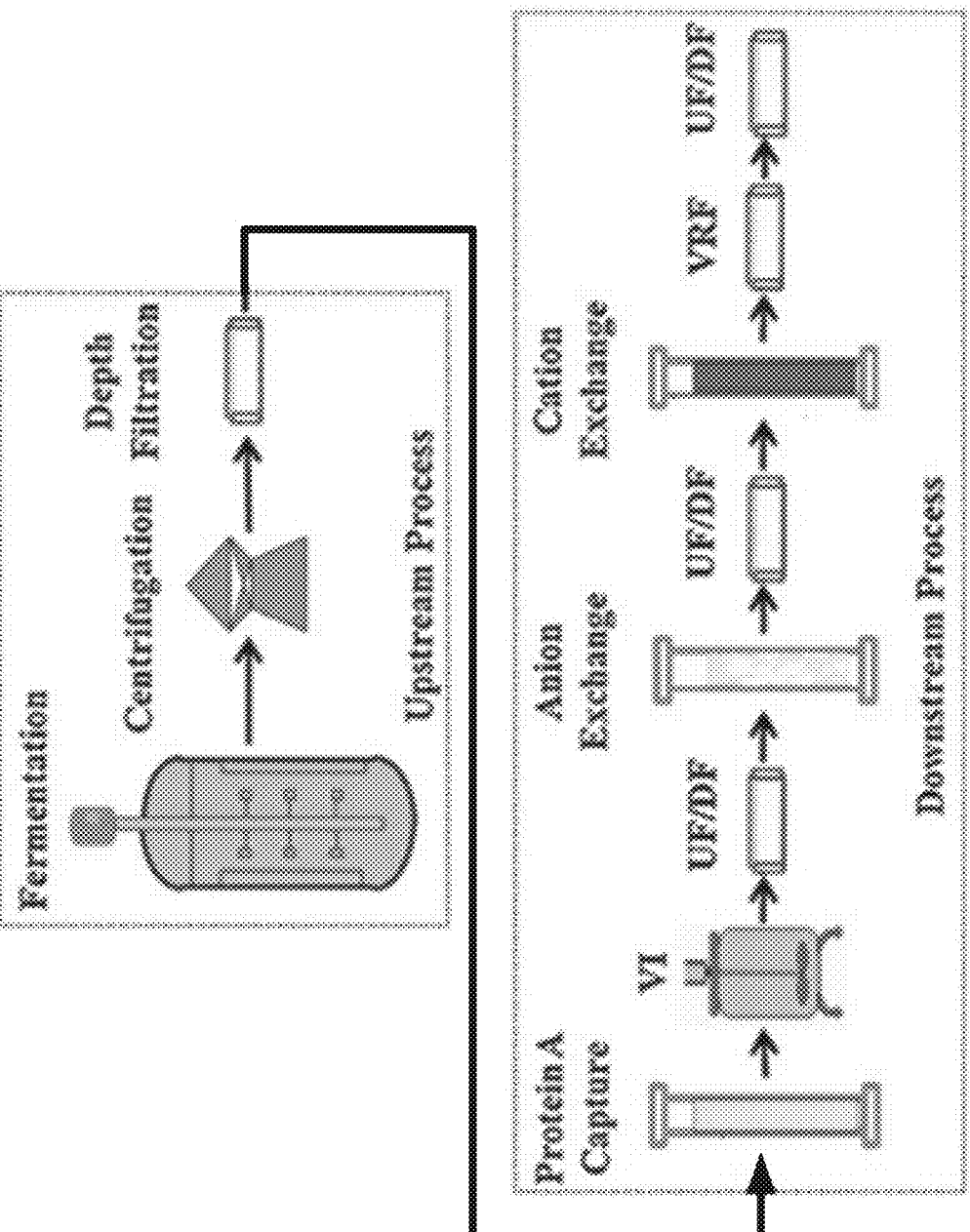
FIG. 5 shows a schematic diagram of application of chromatography in bioprocess downstream purification with monoclonal antibody (mAb) process.

In the chromatography purification process, preparative chromatography techniques have been widely used for monoclonal antibody (mAb) purification after cell fermentation; for human plasma-derived therapeutics, immuno-globulin production, and other downstream protein bio-manufacturing tasks. Referring to FIG. 5, a standard mAb manufacturing process may deploy the affinity chromatography protein A capture using ion-exchange (anion/cation) chromatography (IEC) for target protein purification. Taking IEC as an example, there are multiple physical, process parameters and their interaction will affect the protein chromatography behavior and the final product output. Physical parameters may include stationary resin (bead) type, particle size, surface functional group, work pH range and binding capacity, etc. Operational parameters may include equilibration buffer, loading sample preparation, loading amount, wash and elution buffer type, pH, ion strength and elution procedure, time, pressure, and flow rate.

The Ion-exchange chromatography (IEC) may work on the separation and purification of ionizable molecules. The water-soluble and charged molecules such as proteins bind to moieties that are oppositely charged by forming ionic bonds to the insoluble stationary phase. The equilibrated stationary phase consists of an ionizable functional group where the targeted molecules of a mixture to be separated and quantified can bind while passing through the column. Cation exchange chromatography is used when the desired molecules to separate are cations and anion exchange chromatography is used to separate anions. The bound molecules then can be eluted and collected using an eluant that contains anions and cations by running a higher concentration of ions through the column or changing the pH of the background fluid in the column.

Unlike in R&D settings, the development and scaling up chromatography purification in industrial/manufacturing applications is a complex task. A few factors can be listed as the need for large space, limited material availability, and constricted timelines. In addition, inherent variability in feed streams, e.g. attributes of blood plasma samples originating from different countries/cities can dramatically vary, high purity constraints typically mandated by regulatory entities, and storage/maintenance issues pose additional challenges.

Mechanistic Modeling of Chromatography: Mechanistic modeling techniques may be used to simulate the chroma-tography process, its potential outcomes, and quantify the end products. With enough computational resources, such simulations may be utilized for process design and optimi-zation, risk assessment, design space exploration, and scal-ing-up/technology transfer.

As in other numerical modeling methods, the main objec-tive of building mechanistic models of chromatography may simulate the process computationally rather than experimen-tally which can be expensive and time-consuming. With accurate modeling, subject matter experts (SMEs) may emulate the outcomes of experiments and, thus, reduce the time and cost associated with running physical experiments.

A common use case of mechanistic modeling in the industry has been to perform the design of experiments (DOE) by simulating a set of process and design parameters to observe their effect on the process outcomes of interest. While performing DOE via a mechanistic modeling approach may result in significant time and cost advantages over experimental characterization, there may be some drawbacks to this approach as well which can greatly affect the success of DOE, for example, overall runtime for the simulation of each model can be significant, significant computational means required to explore a complex search space and obtain the best (or optimal) outcome, and/or accuracy of simulations is typically traded for simpler, yet faster, models of the system.

In terms of the computation time of mechanistic models, a permutation of each variable (e.g., a set of design param-eters defining the porosity of the column) needs to be computed for an effective DOE. This means the number of simulations that need to be performed may grow exponen-tially with an increasing number of target variables. For example, while testing three discrete values for two vari-ables requires 9 unique simulation runs, testing three dis-crete values again for five variables requires 243 unique simulation runs. Evaluating the number of variables in the context of chromatography purification, it is reasonable to assume that the process is controlled by many processes (pH, elution ion strength, etc.), design (size, shape, the porosity of column, etc.), and raw material from upstream process (initial concentrations of inputs) parameters. This exponential increase makes it infeasible to perform DOE via conventional mechanistic modeling techniques due to exces-sive or even impossible computational runtimes.

In some implementations, one option to speed up mecha-nistic modeling simulations and make them feasible for DOE to a certain extent is to reduce the level of details in the simulations. In mechanistic modeling, this is generally achieved by either reducing the density of discrete compu-tation points or employing simpler models with less descrip-tive power. While this approach can help build DOE with a greater number of variables, it may not provide an effective modeling approach to observe the effects of input param-eters on the process outcome (e.g. product yield) due to reduced levels of accuracy (of conducted simulations).

In some implementations, accounting for the uncertainties across input batches is another application case of mecha-nistic modeling of chromatography. As commonly encoun-tered in the industrial usage of chromatography purification, input proteins may not always be consistent in terms of their constituents. Since this inconsistency generally results in lower process yields compared to the predicted outcomes with identical inputs, mechanistic modeling presents a way to adjust the process and design parameters to recover the yield to acceptable levels. On the other hand, conventional mechanistic modeling techniques still suffer from the afore-mentioned high-dimensionality issues when optimizing for the best set of process variables for a given protein input constituency.

Governing Equations and Problem Formulation: A gen-eral rate model (GRM) may be one of a family of models of chromatography. GRM is a rigorous first-principles model which may include all main effects in the chromatographic column: a) multi-component sorption, b) mass transfer, c)

diffusion, d) axial dispersion, and e) reaction kinetics. GRM assumes that diffusion is the dominant mechanism for driving the sample molecules from the stream of the 'mobile phase' into the particles and, therefore, inside the pores. It is assumed that the medium inside the pores is stagnant and, therefore, can trap the stationary phase of particles. Also, the 'adsorption-desorption' process takes place between the mobile phase and the surface of the pores. Such processes include: a) film mass transfer, b) pore diffusion, and c) sorption phenomena. Below, the PDEs/ODEs to model each process used in GRM are described.

Figure 7:
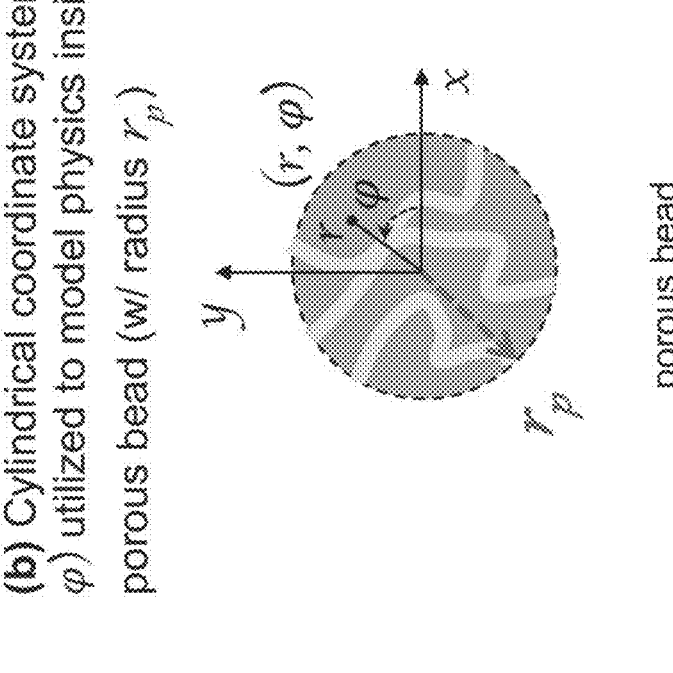
FIG. 7 shows schematics coordinate systems in an exemplary embodiment in the present disclosure.

Referring to FIG. 6, its left side shows schematics of underlying processes occurring in column chromatography occurring at multiple length and timescales; and its right side shows, corresponding to each stage (given length & timescale), mass transfer equations along with sorption (used to model binding rate inside beads). Different time scales cause the GRM (or two-dimensional GRM (GRM2D)) models to be stiff, which poses numerical challenges. FIG. 7 shows schematic and coordinate systems employed by GRM2D (and similar class of models) to capture the conservation laws and processes occurring in column chromatography.

Mass transfer equations. In GRM, mass balance refers to transport of solute molecules through the interstitial column volume and is modeled via multiple competing mechanisms; 'advection-diffusion'; axial dispersion; surface and pore diffusion in beads; and adsorption to the bead surface, which can act as 'source/sink' terms in the general transport equation as below.

$$\frac{\partial c_{p,i}}{\partial t} + u\frac{\partial c_i}{\partial z} = D_{ax,i}\frac{\partial^2 c_i}{\partial z^2} - \frac{3}{\beta_c r_p}\mathcal{J}f,i$$

In above equation, $c_{p,i}$ and $c$ denote, respectively, the concentration of the i-th solute in the stagnant fluid phase inside pores, and the concentration in the continuous phase. $\partial^2 c_i/\partial z^2$ denotes a rate of axial dispersion, which is controlled by $D_{ax,i}$. In addition, $j_{f,i}$ denotes the flux of the i-th component through stagnant film into the bead.

Pore diffusion and liquid mass balance. Pore diffusion occurs in the mobile phase and is responsible for the transport of solute molecules across the open mesoporous network of the particles as below.

$$\frac{\partial c_i}{\partial t} = D_{p,i}\left(\frac{\partial^2 c_{p,i}}{\partial r^2} + \frac{2}{r}\frac{\partial c_{p,i}}{\partial r}\right) - \frac{1}{\beta_p}\frac{\partial q_i}{\partial t}$$

The above equation may only take into account diffusion in the radial (and not axial) direction. $D_{p,i}$ denotes the diffusion coefficient impacted by factors such as tortuosity and constriction of the mesoporous network, The last term in the right-hand-side of the above equation may act as a source/sink term and refer to the rate of change of $q_i$, the loading capacity of the i-th component.

Sorption: Adsorption and desorption equations. There are numerous binding models that may describe ad- and desorption processes in column, e.g. a linear model, a multicomponent Langmuir model, a generalized ion exchange model, a steric mass action and etc. Table 1 provides a comprehensive list of a few common binding models used in modeling this process. For example, for low concentration values, one may use the linear (binding) model given in the following form.

$$\frac{dq_i}{dt} = k_{a,i}c_{p,i} - k_{d,i}q_i$$

As shown in Table 1, there are several binding models that may be applied to model this process. Using 'state' as one major property, it is beneficial to divide existing binding models into two main categories: single-state binding model may model only one bound (or less) state per component; and for multiple-state binding model, multiple (possibly different) bound states for each component, which may be translated into what may correspond to various binding orientations or binding site types.

The third column in Table 1 indicates the existence of this attribute in every (binding) model.

TABLE 1

Common binding models describing sorption process.

| Binding Model Family | Acronym | Multi-state? |
|---|---|---|
| Linear Model | Linear | No |
| Multi Component Langmuir | MCL | No |
| Multi Component Bi-Langmuir | MCBIL | Yes |
| Steric Mass Action | SMA | Yes |
| Multi-State Steric Mass Action | MS-SMA | Yes |
| Generalized Ion Exchange | GIE | No |
| Multi Component Spreading | MCS | Yes |
| Extended Mobile Phase Modulator Langmuir | EMPML | No |

Other models. Depending on the level of accuracy required, computational resources, and outcome of interest, other classes of models are available to model the chromatography process. Table 2 shows different classes of models employed to learn chromatography process, and its last column shows the additional simplifying assumption when compared to the GRM2D model.

TABLE 2

Different classes of models for learning chromatography process

| Model Family | Acronym | Simplifying Assumption (vs. GRM2D) |
|---|---|---|
| Two-dimensional General Rate Model | GRM2D | N/A |
| General Rate Model | GRM | Homogeneous flow in column cross section |
| Lumped Rate Model w/ Pores | LRMP | Neglect pore diffusion |
| Lumped Rate Model w/o Pores | LRM | Neglect pores completely |

In Table 2, a list of common models is provided along with their main simplifying assumptions when compared to GRM. In essence, the solution is agnostic to the set of equations utilized to model mass balance and sorption equations as long as the PINN model can be set up properly. However, SMEs should note what she/he gains—when it comes to the level of details required—when selecting the class of family from Table 2.

Boundary Conditions: Upon choosing the proper set of models (in the form of PDEs and ODEs), proper boundary conditions need to be specified. Mathematically speaking, adding proper BCs renders the system of equations 'well-posed'. For example, when the GRM model given in above equations are selected, the boundary conditions not only augment the PDEs/ODEs to be mathematically well-imposed but also honor a meaningful underlying 'physics'.

For columns, at inlet (z=0), the inlet velocity may be always normal to the cross-section. Conservation of species flux gives:

$$u \cdot c_{inlet,i}(t) = u \cdot c_i(z = 0, t) - D_{ax,i}\frac{\partial c_i}{\partial z}(z = 0, t)$$

For columns, at outlet (z=L), the flow may reach a fully-developed conditions (i.e. vanishing axial gradients) and impose 'Danckwerts' boundary conditions in the following form:

$$\frac{\partial c_i}{\partial z}(z = L, t) = 0$$

For beads, diffusive flux into the beads is proportional to the difference between concentration in the stagnant film and bulk phase surrounding the beads, i.e.

$$\epsilon_p D_{p,i} \cdot \frac{\partial c_{p,i}}{\partial r}(z, t)\bigg|_{r=r_p} = \mathcal{J}f, i$$

For beads, enforcing symmetry as well as mass conservation at the center of the bead (i.e., r=0) results in:

$$\frac{\partial c_{p,i}}{\partial r}(z, t)\bigg|_{r=r_p} = 0$$

Initial Conditions: Under common circumstances, below mathematical profile(s) may be provided as a function of spatial parameters:

$$c_{p,i}(r, z, t = 0) = f_i(r, z) \text{ or } F_i(z),$$

$$c_i(z, t = 0) = g_i(z) \text{ or } G_i,$$

$$q_i(t = 0) = H_i.$$

Numerical challenges posed by multi-physics coupling nature and stiff equations: As binding of proteins described by sorption PDEs (e.g. linear binding model) is assumed to take place on a much faster timescale than the mass transfer phenomena, the problem immediately becomes of stiff nature. In practice, numerical solution of stiff equations poses several challenges, i.e. a) numerical instabilities in solving DEs; b) redundant computations and memory/computational overhead. This may not allow utilizing traditional temporal integration methods, e.g. the family of Euler methods. There are several numerical approaches that can address the stiff ODE/PDE systems of equations.

The present disclosure describes various embodiments with solutions for providing an integrated framework for simulating chromatography purification process with high fidelity and at near real-time speeds via Chroma-PINN. Having access to a rich and wide range of simulation data from Chroma-PINN, a Bayesian optimization scheme may then be employed to efficiently determine the best set of chromatography parameters for a target output of interest. The framework in various embodiments also includes the Chroma-DigitalTwin solution, which is a custom digital twin architecture with real-time process metrics querying and continuous model update functionalities.

Chroma-PINN: PINN is a special class of neural network (NN) that can output results by learning to solve governing ODEs/PDEs. In particular, the loss function in a PINN is constructed in such a way that the set of ODEs/PDEs—along with appropriate initial/boundary conditions—describing the physics of the problem at hand is satisfied. In hybrid PINNs the loss function also includes supervised learning term(s) pertaining to the deviation of predictions from observations in a probabilistic or regressive sense, depending on the problem.

In pure physics-informed settings, PINN outputs are only guided by the governing equations, initial/boundary conditions and other predefined constraints of the problem. When the data-driven terms are incorporated into the loss function, the hybrid PINN becomes able to tackle with three critical shortcomings of pure physics-driven approaches. Specifically, by guiding the problem solution with a combination of governing physics and observed data: the inaccuracies due to the uncertainties in governing equations are reduced, the inaccuracies due to the approximations or simplifications in governing equations are reduced, and/or the inaccuracies due to the misrepresentations in model definitions are reduced.

Figure 8:
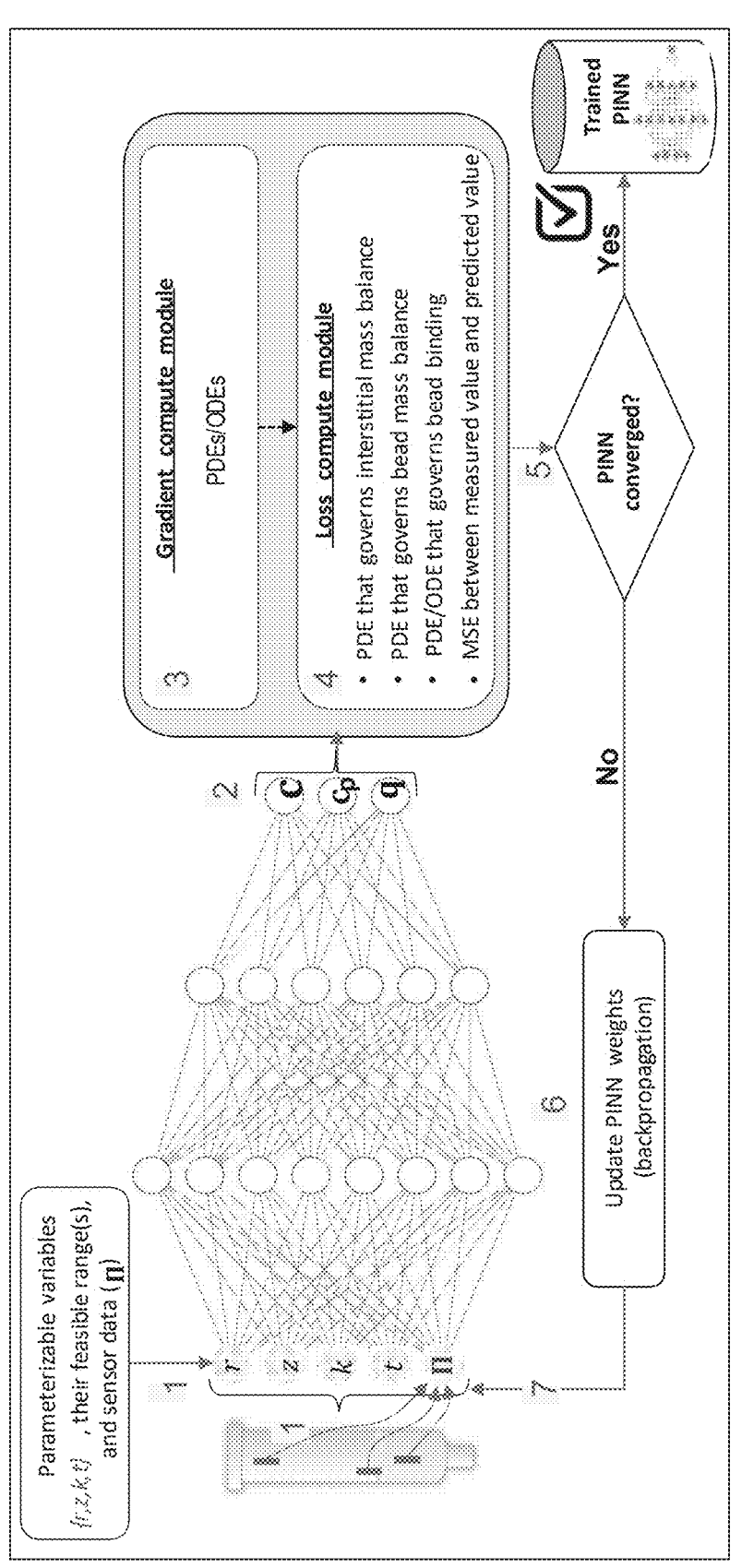
FIG. 8 shows a schematic diagram of an exemplary embodiment in the present disclosure.

Referring to FIG. 8, a Chroma-PINN employs a hybrid physics- and data-driven architecture and custom-architects four key components of PINN specific to chromatography purification. Namely, these are handling of the input layer, output layer, the loss function, and the coupling of different time scales.

FIG. 8 shows an exemplary architecture of Chroma-PINN component in various embodiments in the present disclosure. A NN is constructed and trained such that it satisfies the PDEs/ODEs describing the chromatography setup and the historic input-output relationships. In the most general case, when trained, Chroma-PINN outputs concentration fields (as vectors), i.e. $c=[c_1, c_2, \ldots, c_M]$ and $c_p=\{c_{p,1}, c_{p,2}, \ldots, c_{p,M}\}$, and binding rate $q=\{q_1, q_2, \ldots, q_M\}$. The input layer consists of chromatography column process variables (which can take a range of values for parameterization) and historic data from chromatogram sensors $\Pi$. The design variables may characterize different column geometries, various interstitial medium, solutes, and beads.

Input layer. The input layer of PINNs may generally receive terms that can be parameterized. This approach is powerful when the objective is to characterize the impact of varying parameters on outcomes in large dimensional search spaces. In training-time, PINN learns to find solutions for any input value within the parameterization range, and at test-time (or inference time), inference of a single set of input conditions is very quick and accurate. In Chroma-PINN, the input layer is designed to incorporate a wide range of operation, process control, and design variables of chromatography purification in a parameterized form as well as data from sensors in the chromatogram. A set of applicable variables are presented for the case of IEC. As for the determination of feasible lower and upper bounds of variables, the opinion of SMEs is sought. Once the variables to be parameterized are determined and their ranges are set, the input layer definition of PINN is complete and the hidden layers can be chosen amongst various options that are demonstrated to be suitable for PINN.

Output layer. The output layer of PINNs is similarly application-specific. Namely, it generally consists of the simulation outcome(s) of interest that can be computed via the governing equations of the system and the process outcomes that can be measured in training and test-time. In the case of chromatography, protein concentrations are one of the sought-after results of the process. Thus, a vectorized form of concentrations is the common constituents of the output layer for Chroma-PINN.

Loss function. Composition of the loss function is another aspect unique to PINNs. As opposed to only minimizing the distance between the data seen in a training set and the predictions of the NN, PINNs primarily quantify the difference between governing physics of the problem and the predictions of the NN and considers data-driven term as an additional component. This is achieved by constructing the loss function as a superposition of the (i) BCs/ICs, (ii) PDEs/ODEs that describe the system, and (iii) the difference between measured and predicted output metrics. This architecture drives the results of PINN to physically feasible as well as realizable ones. In Chroma-PINN, the loss module consists of PDEs that describe the physics of chromatography and MSE between a subset of measured and predicted constituent concentrations: interstitial mass balance PDE (such as an equation that models advection, dispersion, and film mass transfer phenomena between interstitial medium and porous bead via GRM), bead mass balance PDE (such as an equation that models diffusion and sorption within porous bead via GRM), bead binding PDE (such as a linear binding model that models adsorption and desorption of proteins within a porous bead).

Complimentary to the PDEs, the other pillar of the loss function is the BCs/ICs in the system, which may be included as physical constraints. Some physical constraints in chromatography comprise: predefined piecewise flux profiles at column inlet, zero concentration variation at column outlet, diffusive flux into beads equal to the flux through stagnant film, and/or zero concentration variation at bead centers.

In addition to these physical terms, a data-driven MSE term that quantifies the difference between a measured concentration and the corresponding predicted concentration is also employed as a term to incorporate the awareness from actual process.

The loss function is established by superposing all these terms described above. Minimizing this function during training of the PINN resolves the physical and observed processes that take place during chromatography and is a direct indicator of the chromatography progression.

Coupling of different time scales (stiffness). As previously described, the binding process in chromatography takes place at a much faster timescale than the mass transfer phenomena. This causes the differential equation system to be stiff and poses challenges in its numerical solution. In Chroma-PINN, the stiffness effect may be alleviated by employing a quasi-steady-state approximation, which was demonstrated to be an effective approach for tackling stiffness in PINNs. Accordingly, the change in stationary phase concentration in the sorption equation may be assumed to be equal to zero, i.e.

$$\frac{dq_i}{dt} = 0.$$

This implementation may promote convergence of training without creating any significant solution inaccuracy.

Figure 9:
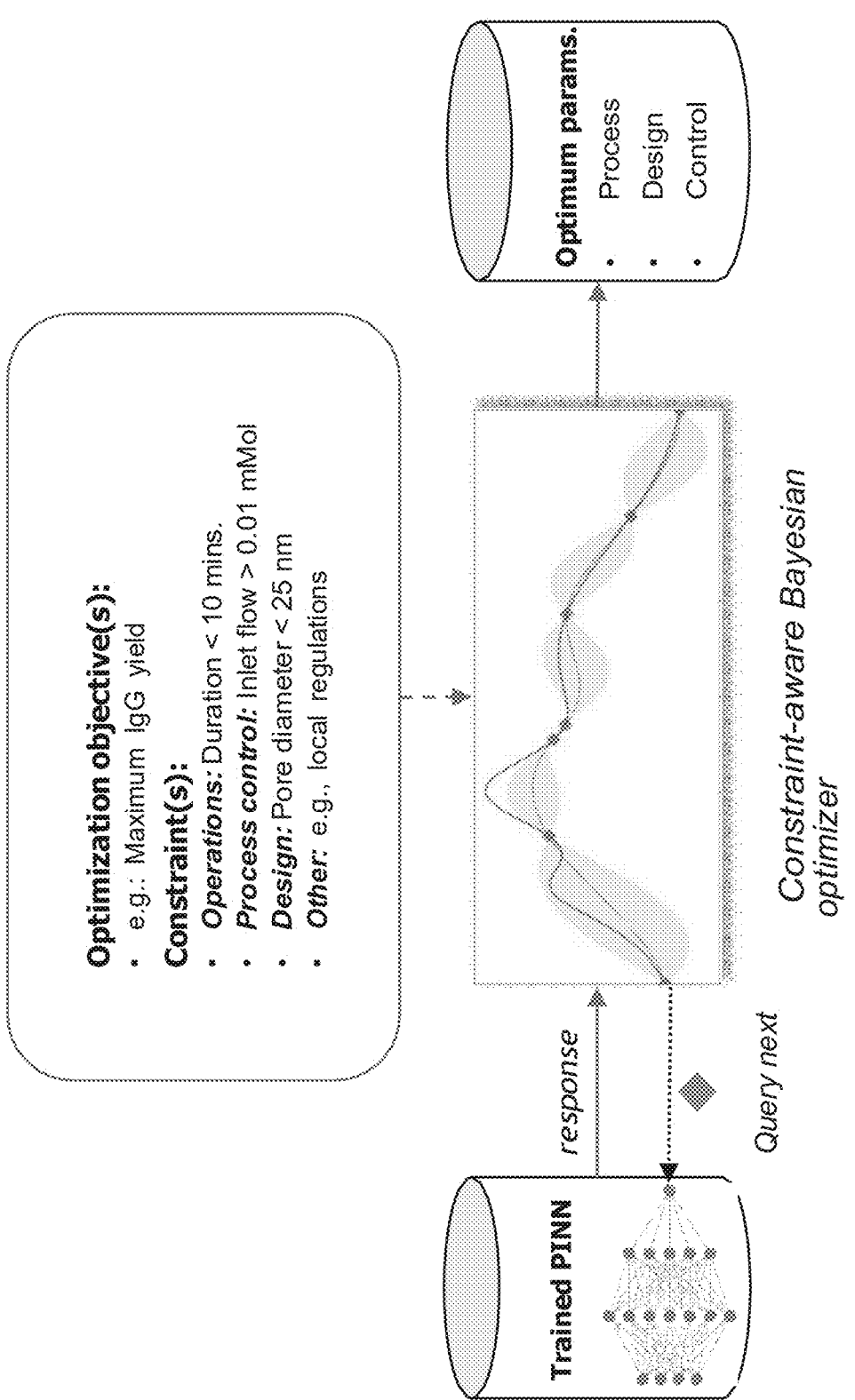
FIG. 9 shows a schematic diagram of a reference architecture of an exemplary Bayesian optimizer in the present disclosure.

Process optimization. Readily access to a wide range of high-fidelity "what-if" scenarios enable effective optimization routines for finding a set of chromatography process parameters to maximize/minimize a desired process output. FIG. 9 shows a reference architecture to a Bayesian optimizer informed by the samples supplied by a trained Chromatography PINN model. Even though data-driven optimizers are generally not suitable for tasks that involve complex physics, due to the difficulty in generating high-accuracy data at large volumes, this is not the case in the present disclosure, because, here, the trained model of Chroma-PINN essentially acts as an 'on-demand data generator' (a.k.a. function evaluator) for the optimizer by supplying full-fidelity simulation outcomes at very high rates.

With this approach an optimum set of operation, process control, and design parameters can be predicted to minimize/maximize a single or multiple process outcome(s) of interest, such as maximizing the concentration of IgG at the end. In addition to the pre-defined feasible ranges for variables, optimization search space can be constrained also by user-defined limits on various parameters. Optimization is an iterative process and at each iteration the optimizer determines a course of action toward the objective based on analyzing the impact of changing variables on the process outcomes.

With 'PINN-in-the-loop' approach the task of finding the best solution becomes much quicker than existing approaches that employ conventional mechanistic modeling or experimentation-based techniques. The method also produces results that are more accurate and higher fidelity than computationally lightweight data-driven modeling techniques, since the PINN is informed by the governing physics of the process. Finally, as the parameter selection process is physics-informed instead of being data-driven, the decision process is highly explainable for any further analysis or reporting.

Figure 10:
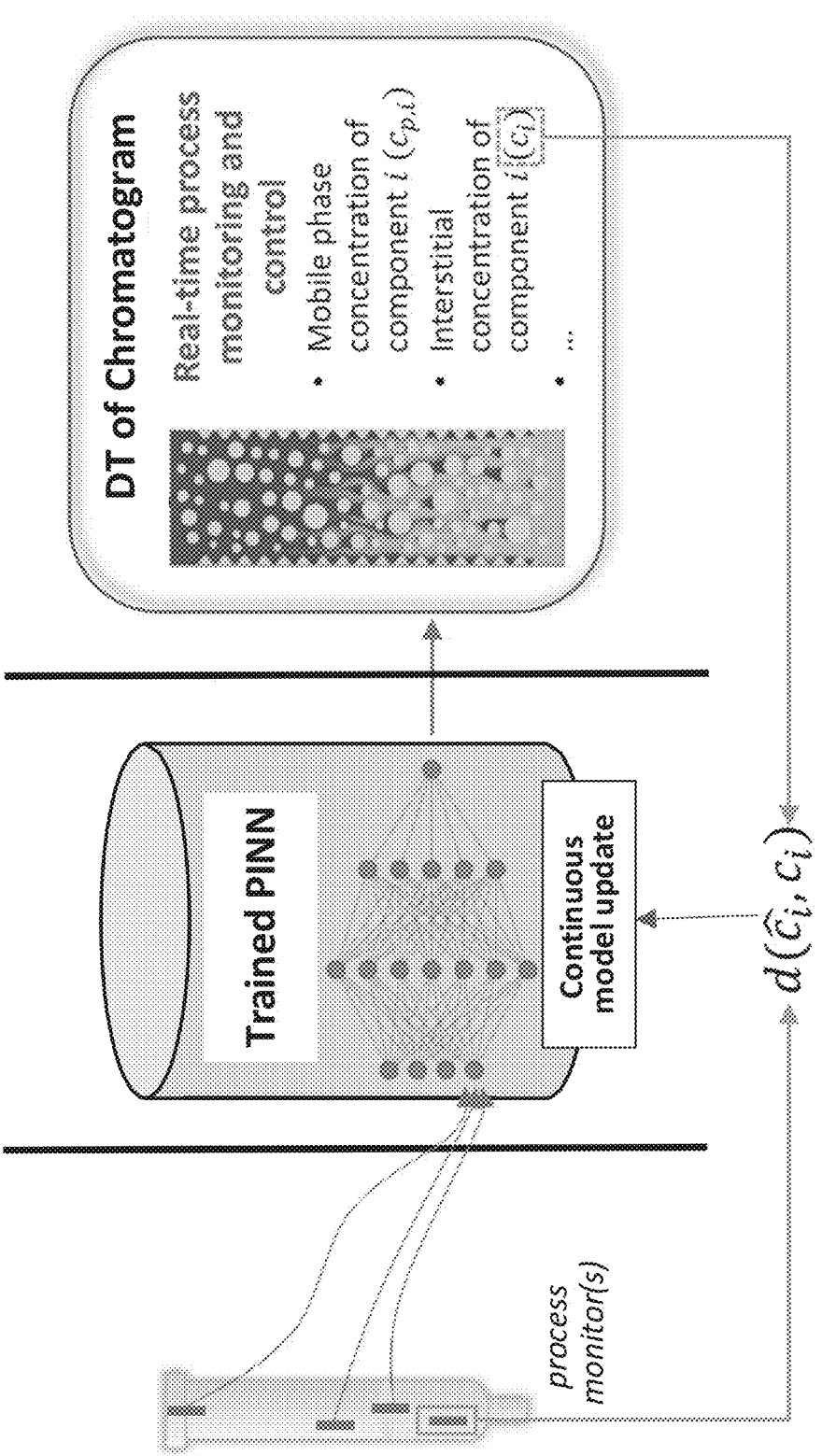
FIG. 10 shows a schematic diagram of a reference architecture of an exemplary digital twin system in the present disclosure.

Chroma-DigitalTwin: FIG. 10 shows a schematic diagram of a reference architecture of a digital twin system called Chroma-DigitalTwin. This system complements and expands the Chroma-PINN platform in two fronts: (i) enables the prediction and reporting of real-world chromatography process metrics at any instant during the process by continuously running Chroma-PINN in inference mode; and (ii) enables continuous re-training of the Chroma-PINN model by leveraging real-time data collection and hybrid architecture of the PINN model. Having an integral PINN model in a digital twin brings benefits to process monitoring and control as well as to model update for the chromatography process.

Advanced chromatography process monitoring and control. Primary objective of Chroma-DigitalTwin is to establish a platform for providing various metrics to the user throughout the operation of a chromatography process. The metrics that the system provide are generated by processing the signals collected by sensors on the chromatogram via the trained PINN model. This processing takes place continuously throughout the operation to provide near real-time data to the user.

The differentiating factor of the system in the present disclosure compared to other DT solutions that perform no to very little physics simulations on sensor data is related to the level of detail the DT generates. By continuously querying the Chroma-PINN model and refreshing the knowledge state according to its predictions, Chroma-DigitalTwin becomes a highly detailed and frequently updating digital representation of a chromatogram.

In some implementations, the trained model of Chroma-PINN makes it possible to predict process metrics of interest, such as protein concentrations at mobile and stationary phases. The ability to estimate process state in a continuous closed-loop manner paves the way for advanced process control capability for next-generation chromatography purification operations. A novel chromatography system that employs Chroma-DigitalTwin could allow a user operator or an autonomous controller to modify operation and/or process parameters of chromatogram on the go based on real-time predictions for improved process outcome, overriding pre-defined parameters.

Continuous model update. Due to various pre-existing uncertainties, approximations/simplifications, or misrepresentations, models—analytical, data-driven, or hybrid—generally come with some level of stochasticity. These variabilities may generally be caused by factors that are not feasible to mitigate such as limited device tolerances or physics that are unknown or cannot reasonably be accounted for. Provided that they are significant, these factors may be a major cause of inaccuracy for the simulation outcomes.

Chroma-PINN is designed with model update in mind for continuous refinement and error correction of the model using real-world data. Due to the near real-time prediction capability of Chroma-PINN, simulation data can be generated at the same rate as sensor readings are taken, which enables real-world and simulated data sources for the same metric to co-exist. As the real-time sensor data generally contains less uncertainty than pre-assumed parameters, it is considered that the real-world readings are more accurate than the predicted value of the same quantity. On the other hand, the properties that can be measured by real-time sensors are limited and they are only a small subset of the metrics that can be predicted by a model.

The model update mechanism incorporated to Chroma-DigitalTwin consists of a functional unit (or worker) that continuously quantifies the difference between the predictions of PINN and sensor readings for the same metric (concentration c given as example in FIG. 10). Referring to the algorithm in FIG. 11, when the difference between the measured and predicted value of the same quantity exceeds a certain threshold, a self-update module re-trains the model with this "distance term model included in the loss function. The continuous self-update process forces the PINN model to readjust its weights to those that will provide a more accurate representation of the current state of the system. FIG. 11 shows the algorithm (Algorithm 1) for the technical implementation of this mechanism in detail.

In the embodiments and implementation of this disclosure, any steps and/or operations may be combined or arranged in any amount or order, as desired. Two or more of the steps and/or operations may be performed in parallel. Embodiments and implementations in the disclosure may be used separately or combined in any order.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal (e.g., non-transitory medium). The non-transitory medium may refer to computer-readable media (CRM) that stores data for extended periods or for short period in the presence of power, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

While the particular disclosure has been described with reference to illustrative embodiments, this description is not meant to be limiting. Various modifications of the illustrative embodiments and additional embodiments of the disclosure will be apparent to one of ordinary skill in the art from this description. Those skilled in the art will readily recognize that these and various other modifications can be made to the exemplary embodiments, illustrated and described herein, without departing from the spirit and scope of the present disclosure. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

APPENDIX A: NOMENCLATURE

BC: Boundary Condition
CFD: Computational Fluid Dynamics
DE: Differential Equation
DNN: Deep Neural Networks
DOE: Design Of Experiments
DT: Digital Twin
GRM: General Rate Model
GRM2D: Two-Dimensional General Rate Model
IC: Initial Condition
IEC: Ion-Exchange Chromatography
IgG: Immunoglobulin G
KPI: Key Performance Indicator
LRM: Lumped Rate Model without Pores
LRMP: Lumped Rate Model with Pores
mAb: monoclonal Antibody
MSE: Mean Squared Error NN: Neural Networks
ODE: Ordinary Differential Equation
PDE: Partial Differential Equation
PINN: Physics-Informed Neural Networks
SME: Subject Matter Expert
UF/DF: Ultra-Filtration/Dia-Filtration
VI: Virus Inactivation
VRF: Virus Retention Filtration

What is claimed is:

1. A system for optimization of a chromatography purification process using a physics-informed neural network, the system comprising:
a non-transitory memory storing instructions; and
a processor circuitry in communication with the non-transitory memory, wherein, the processor circuitry executes the instructions to cause the system to:
train the physics-informed neural network comprised in a digital twin model for providing process metrics and dynamic process control information to the chromatography purification process by:
inputting a plurality of process parameters into the physics-informed neural network to obtain a predicted output,
wherein the plurality of process parameters comprises a set of chromatography column process variables, or historic data from chromatogram sensors;
co-relating in an input layer, the process variables with operational and design variables in a parameterized form and the historic data from the chromatogram sensors;
predicting via an output layer of the physics-informed neural network, the predicted output guided by a set of governing equations, and a set of constraints of the chromatography purification process;
calculating a loss function via a loss layer of the physics-informed neural network based on the set of governing equations, the set of constraints of the chromatography purification process, and the predicted output,
wherein the set of governing equations includes at least one partial differential equation (PDE) or ordinary differential equation (ODE), at least one boundary condition (BC), or at least one initial condition (IC) and wherein the loss layer computes the loss function based on a weighted combination of the BCs/ICs and PDEs/ODEs that describes the chromatography purification process;
calculating a loss score based on the loss function;
determining whether the physics-informed neural network is convergent based on the calculated loss function;
in response to the physics-informed neural network being convergent, export the physics-informed neural network as a trained physics-informed neural network,
wherein the physics-informed neural network is convergent when the calculated loss score is smaller than a pre-defined threshold;
in response to the physics-informed neural network not being convergent:
update a plurality of weights via backpropagation in the physics-informed neural network, and
input the plurality of process parameters to the physics-informed neural network for a next convergence iteration to calculate the loss function and determine whether the physics-informed neural network is convergent;
exporting the trained physics-informed neural network includes:
iteratively inputting the predicted output into a Bayesian optimizer for optimizing the plurality of process parameters based on an optimization objective, wherein the optimization objective comprises maximizing a protein concentration, or minimizing a quantity of material consumption, and
wherein the iteration in the Bayesian optimizer continues for a number of times until the plurality of process parameters are optimized based on the optimization objective;
output the dynamic process control information from the digital twin model based on the process metrics; and
change the plurality of process parameters on the chromatography purification process based on the output dynamic process control information.

2. The system according to claim 1, wherein:
the plurality of process parameters comprises at least one of the following: one or more operation parameters, one or more process control parameters, one or more design parameters, or sensory data.

3. The system according to claim 1, wherein:
the set of governing equations comprises at least one of the following:
one or more interstitial mass balance partial differential equation (PDE),
one or more bead mass balance PDE, or
one or more sorption PDE.

4. The system according to claim 3, wherein:
the set of governing equations comprises the one or more sorption PDE, which comprises a quasi-stead-state approximation.

5. The system according to claim 1, wherein when the processor circuitry executes the instructions to cause the system to calculate the loss function based on the set of governing equations and the predicted output, the processor circuitry executes the instructions to cause the system to:
input the plurality of process parameters into the set of governing equations to obtain a result based on at least one boundary condition and/or at least one initial condition; and
calculate the loss function based on the predicted output and the result.

6. The system according to claim 1, wherein, after the physics-informed neural network is exported, the processor circuitry executes the instructions to cause the system to:
input the predicted output into the Bayesian optimizer for optimizing the plurality of process parameters based on the optimization objective;
generate a new plurality of process parameters by the Bayesian optimizer based on the optimization objective;
input the new plurality of process parameters into the physics-informed neural network to obtain a new predicted output; and
input the predicted output into the Bayesian optimizer for a next optimizer iteration.

7. The system according to claim 6, wherein:
the Bayesian optimizer comprises a constraint-aware Bayesian optimizer.

8. The system according to claim 1, wherein: the processor circuitry executes the instructions to further cause the system to:

obtain a reading by the sensor based on an output of the chromatography purification process; and in response to a difference between the reading from the chromatography purification process and a corresponding prediction from the physics-informed neural network exceeding the pre-defined threshold:

update the loss function based on the difference, and train the physics-informed neural network based on the updated loss function.

9. A method for optimization of a chromatography purification process using a physics-informed neural network, the method comprising:

training, the physics-informed neural network comprised in a digital twin model for providing process metrics and dynamic process control information to the chromatography purification process by:

inputting, by a device comprising a memory storing instructions and a processor in communication with the memory, a plurality of process parameters into the physics-informed neural network to obtain a predicted output, wherein the plurality of process parameters comprises a set of chromatography column process variables, or historic data from chromatogram sensors;

co-relating, in an input layer, the process variables with operational and design variables in a parameterized form and the historic data from the chromatogram sensors;

predicting, via an output layer of the physics-informed neural network, the predicted output guided by a set of governing equations, and a set of constraints of the chromatography purification process;

calculating, by the device, a loss function via a loss layer of the physics-informed neural network based on a set of governing equations, as set of constraints of the chromatography purification process, and the predicted output, wherein the set of governing equations includes at least one partial differential equation (PDE) or ordinary differential equation (ODE), at least one boundary condition (BC), or at least one initial condition (IC) and wherein the loss layer computes the loss function based on a weighted combination of the BCs/ICs and PDEs/ODEs that describes the chromatography purification process;

calculating a loss score based on the loss function;

determining, by the device, whether the physics-informed neural network is convergent based on the calculated loss function;

in response to the physics-informed neural network being convergent, exporting, by the device, the physics-informed neural network as a trained physics-informed neural network, wherein the physics-informed neural network is convergent when the calculated loss score is smaller than a pre-defined threshold;

in response to the physics-informed neural network not being convergent:

updating, by the device, a plurality of weights via backpropagation in the physics-informed neural network, and inputting, by the device, the plurality of process parameters to the physics-informed neural network for a next convergence iteration to calculate the loss function and determine whether the physics-informed neural network is convergent;

exporting, the trained physics-informed neural network includes:

iteratively inputting the predicted output into a Bayesian optimizer for optimizing the plurality of process parameters based on an optimization objective, wherein the optimization objective comprises maximizing a protein concentration, or minimize a quantity of material consumption, and wherein the iteration in the Bayesian optimizer continues for a number of time until the plurality of process parameters is optimized based on the optimization objective;

output the dynamic process control information from the digital twin model based on the process metrics; and change the plurality of process parameters on the chromatography purification process based on the output dynamic process control information.

10. The method according to claim 9, wherein:

the plurality of process parameters comprises at least one of the following: one or more operation parameters, one or more process control parameters, one or more design parameters, or sensory data.

11. The method according to claim 9, wherein:

the set of governing equations comprises at least one of the following:

one or more interstitial mass balance partial differential equation (PDE), one or more bead mass balance PDE, or one or more sorption PDE.

12. The method according to claim 9, wherein when the calculating the loss function based on the set of governing equations and the predicted output comprises:

inputting the plurality of process parameters into the set of governing equations to obtain a result based on at least one boundary condition and/or at least one initial condition; and calculating the loss function based on the predicted output and the result.

13. The method according to claim 9, wherein: after the exporting the physics-informed neural network, the method further comprises inputting the predicted output into the Bayesian optimizer for optimizing the plurality of process parameters based on the optimization objective;

generating a new plurality of process parameters by the Bayesian optimizer based on the optimization objective;

inputting the new plurality of process parameters into the physics-informed neural network to obtain a new predicted output; and inputting the predicted output into the Bayesian optimizer for a next optimizer iteration.

14. The method according to claim 9, further comprising:

obtaining a reading by the sensor based on an output of the chromatography purification process; and in response to a difference between the reading from the chromatography purification process and a corresponding prediction from the physics-informed neural network exceeding the pre-defined threshold:

updating the loss function based on the difference, and training the physics-informed neural network based on the updated loss function.

15. A product comprising:

machine-readable media other than a transitory signal;

instructions stored on the machine-readable media; and wherein when a processor circuitry executes the instructions, the product is configured to cause the processor circuitry to:

train the physics-informed neural network comprised in a digital twin model for providing process metrics and dynamic process control information to the chromatography purification process by:

inputting a plurality of process parameters into the physics-informed neural network to obtain a predicted output, wherein the plurality of process parameters comprises a set of chromatography column process variables, or historic data from chromatogram sensors;

co-relating in an input layer, the process variables with operational and design variables in a parameterized form and the historic data from the chromatogram sensors;

predicting via an output layer of the physics-informed neural network, the predicted output guided by a set of governing equations, and a set of constraints of the chromatography purification process;

calculating a loss function via a loss layer of the physics-informed neural network based on the set of governing equations, the set of constraints of the chromatography purification process, and the predicted output, wherein the set of governing equations includes at least one partial differential equation (PDE) or ordinary differential equation (ODE), at least one boundary condition (BC), or at least one initial condition (IC) and wherein the loss layer computes the loss function based on a superposition of the BCs/ICs and PDEs/ODEs that describes the chromatography purification process;

calculating a loss score based on the loss function;

determining whether the physics-informed neural network is convergent based on the calculated loss function;

in response to the physics-informed neural network being convergent, export the physics-informed neural network as a trained physics-informed neural network, wherein the physics-informed neural network is convergent when the calculated loss score is smaller than a pre-defined threshold;

in response to the physics-informed neural network not being convergent:

update a plurality of weights via backpropagation in the physics-informed neural network, and input the plurality of process parameters to the physics-informed neural network for a next convergence iteration to calculate the loss function and determine whether the physics-informed neural network is convergent;

exporting the trained physics-informed neural network includes:

iteratively inputting the predicted output into a Bayesian optimizer for optimizing the plurality of process parameters based on an optimization objective, wherein the optimization objective comprises maximizing a protein concentration, or minimize a quantity of material consumption, and wherein the iteration in the Bayesian optimizer continues for a number of time until the plurality of process parameters is optimized based on the optimization objective;

output the dynamic process control information from the digital twin model based on the process metrics; and change the plurality of process parameters on the chromatography purification process based on the output dynamic process control information.

* * * * *